US009268511B2

(12) United States Patent
Kadota

(10) Patent No.: US 9,268,511 B2
(45) Date of Patent: Feb. 23, 2016

(54) INFORMATION DISTRIBUTION PROCESSING PROGRAM, COMPUTER, INFORMATION DISTRIBUTION PROCESSING METHOD, AND INFORMATION DISTRIBUTION PROCESSING SYSTEM

(75) Inventor: Masatoshi Kadota, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1592 days.

(21) Appl. No.: 11/528,386

(22) Filed: Sep. 28, 2006

(65) Prior Publication Data
US 2007/0088869 A1 Apr. 19, 2007

(30) Foreign Application Priority Data

Sep. 28, 2005 (JP) ................................. 2005-282342

(51) Int. Cl.
G06F 3/00 (2006.01)
G06F 3/12 (2006.01)

(52) U.S. Cl.
CPC ............ *G06F 3/1229* (2013.01); *G06F 3/1207* (2013.01); *G06F 3/1285* (2013.01)

(58) Field of Classification Search
USPC ......... 709/200–203, 217, 218, 227, 229, 230, 709/249; 710/61, 72, 105, 261; 712/229, 1; 345/522, 523, 526, 508; 358/1.1, 1.6, 358/1.9, 1.12, 1.13, 1.14, 1.15, 518, 530, 358/448, 444, 450, 453, 462
See application file for complete search history.

(56) References Cited

U.S. PATENT DOCUMENTS

| 6,785,748 | B2 * | 8/2004 | Mikuni et al. | 710/15 |
| 6,954,839 | B2 * | 10/2005 | Idei et al. | 711/202 |
| 7,117,350 | B2 * | 10/2006 | Harada | 713/1 |
| 7,475,244 | B2 * | 1/2009 | Sugikawa | 713/168 |

(Continued)

FOREIGN PATENT DOCUMENTS

| JP | 7-143146 A | 6/1995 |
| JP | 2000-293324 | 10/2000 |
| JP | 2002-175208 A | 6/2002 |

OTHER PUBLICATIONS

JP Office Action dtd May 18, 2010, JP Appln. 2005-282342, English translation.

(Continued)

Primary Examiner — Saket K Daftuar
(74) Attorney, Agent, or Firm — Banner & Witcoff, Ltd.

(57) ABSTRACT

A computer program product comprises computer-readable instructions that cause a computer to function as: a command transmission request receiving unit which receives a command transmission request issued by each information processing unit of an information processing device which includes a plurality of information processing units executing information processing based on device information as information on a device; a command transmitting unit which transmits a command corresponding to the command transmission request received by the command transmission request receiving unit to the device via an interface; a device information acquiring unit which acquires the device information supplied from the device as a response to the command; and a device information supplying unit which is configured to supply the device information acquired by the device information acquiring unit to the information processing units as needed.

17 Claims, 12 Drawing Sheets

(56) References Cited

U.S. PATENT DOCUMENTS

| | | | |
|---|---|---|---|
| 7,587,496 B2* | 9/2009 | Matsushima | 709/227 |
| 7,693,994 B2* | 4/2010 | Matsushima | 709/226 |
| 2001/0013032 A1* | 8/2001 | Kobayashi et al. | 707/1 |
| 2002/0039194 A1* | 4/2002 | Nakao et al. | 358/1.14 |
| 2002/0049873 A1* | 4/2002 | Mikuni et al. | 710/73 |
| 2002/0194468 A1* | 12/2002 | Betts-LaCroix et al. | 713/100 |
| 2003/0231168 A1* | 12/2003 | Bell et al. | 345/173 |
| 2004/0092249 A1* | 5/2004 | Sugikawa | 455/411 |
| 2004/0186935 A1* | 9/2004 | Bell et al. | 710/72 |
| 2005/0033804 A1* | 2/2005 | Iwami et al. | 709/203 |
| 2005/0080916 A1* | 4/2005 | Katayama | 709/232 |
| 2005/0131907 A1* | 6/2005 | Matsuzawa et al. | 707/10 |
| 2005/0185364 A1* | 8/2005 | Bell et al. | 361/679 |
| 2005/0193187 A1* | 9/2005 | Harada | 713/1 |
| 2006/0009907 A1* | 1/2006 | Kuroda et al. | 701/200 |
| 2006/0085498 A1* | 4/2006 | Matsushima | 709/202 |
| 2006/0095918 A1* | 5/2006 | Hirose | 718/104 |
| 2006/0112220 A1* | 5/2006 | Otsuka et al. | 711/114 |
| 2006/0129721 A1* | 6/2006 | Betts-LaCroix et al. | 710/104 |
| 2007/0032193 A1* | 2/2007 | Wada et al. | 455/41.2 |
| 2007/0208892 A1* | 9/2007 | Betts-LaCroix et al. | 710/62 |
| 2009/0089580 A1* | 4/2009 | Sugikawa | 713/168 |

OTHER PUBLICATIONS

JP Office Action dtd Oct. 12, 2010, JP Appln. 2005-282342, English Translation.

* cited by examiner

United States Patent US 9,268,511 B2

INFORMATION DISTRIBUTION PROCESSING PROGRAM, COMPUTER, INFORMATION DISTRIBUTION PROCESSING METHOD, AND INFORMATION DISTRIBUTION PROCESSING SYSTEM

CROSS-REFERENCE TO RELATED APPLICATION

This application claims priority under 35 U.S.C. §119 from Japanese Patent Application No. 2005-282342, filed on Sep. 28, 2005. The entire subject matter of the application is incorporated herein by reference.

BACKGROUND

1. Technical Field

The present invention relates to an information distribution processing program, a computer, an information distribution processing method and an information distribution processing device to be used for distributing device information acquired from a device to a plurality of information processing units.

2. Related Art

Programs for acquiring device information on a device from the device via an interface and executing information processing by use of the acquired device information have widely been known as disclosed in Japanese Patent Provisional Publication No. 2000-293324, for example.

A printer status management program 3c described in the above patent document (paragraph [0072], FIG. 5) is configured to execute a process for acquiring information on a printer 2c through a port communication program 3e, a process for storing the acquired information in a storage area 3d, a process for supplying the information to an SNMP processing program 3b, etc.

However, in an information processing device capable of executing a plurality of processes in parallel in a time-sharing manner, a plurality of information processing tasks can be executed by a plurality of information processing units in parallel according to programs like the above printer status management program 3c. In such an information processing device, each of the information processing units can try to acquire information from one device and if the device is configured to supply information only once, even information originally supposed to be acquired by a particular information processing unit A can be taken first by another information processing unit B. In such cases, the information processing unit A can not acquire the necessary information.

Specifically, in a system configured so that a device prepares its device information only once at its own suitable timing and the device information is acquired by an information processing unit at its own suitable timing, if an information processing unit B first tries to acquire the device information after the preparation of the device information by the device and succeeds in the acquisition of the device information, an information processing unit A trying to acquire the device information later can not acquire the expected device information.

SUMMARY

The present invention which has been made in consideration of the above problems is advantageous in that an information distribution processing program, a computer, an information distribution processing method and an information distribution processing device, allowing each information processing unit to acquire necessary device information on a device without fail even when the device information is supplied by the device only once and the device information has already been acquired by another information processing unit, can be provided.

BRIEF DESCRIPTION OF THE ACCOMPANYING DRAWINGS

DETAILED DESCRIPTION

General Overview

Figure 1:
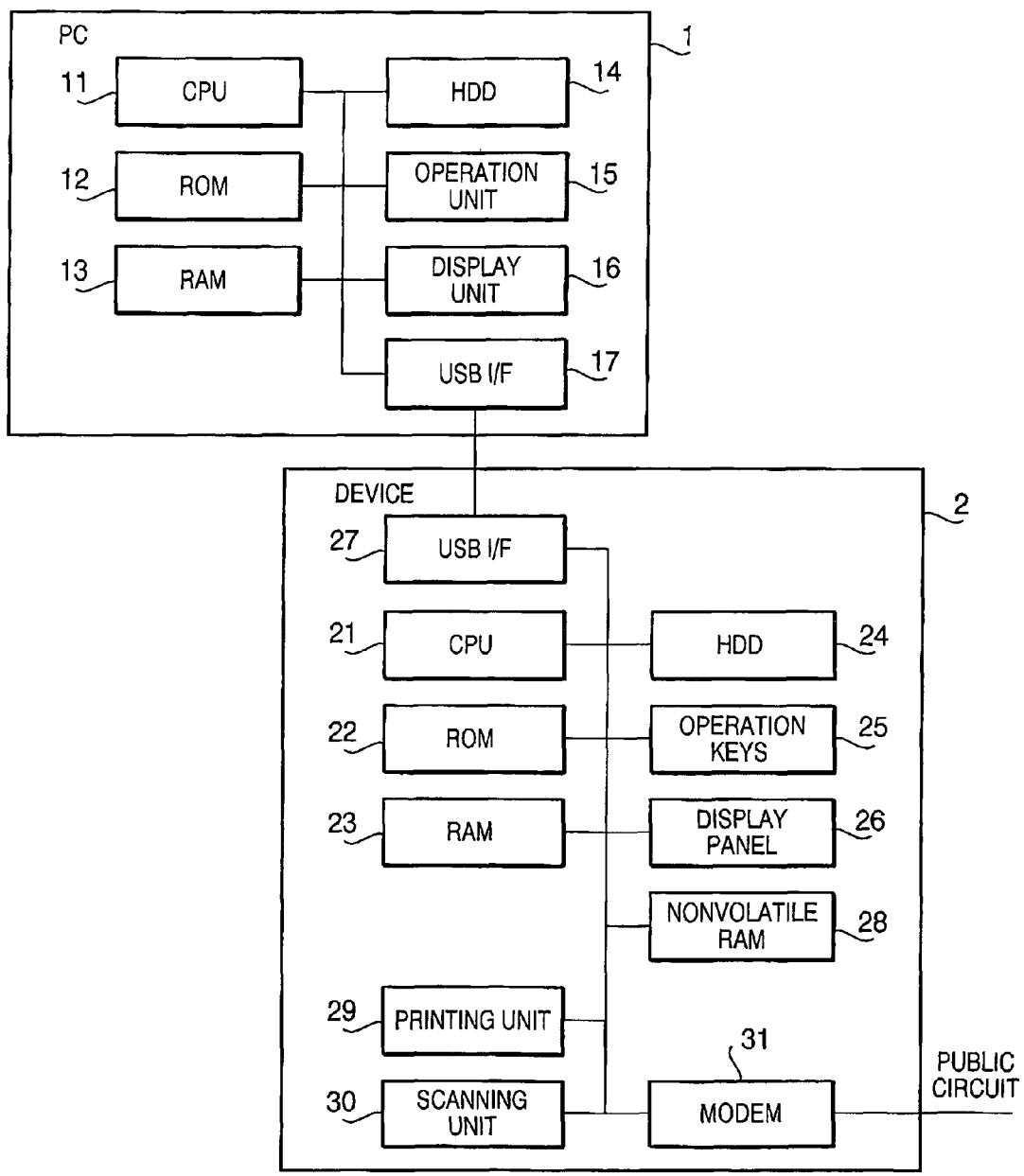
FIG. 1 is a block diagram showing the overall composition of an information distribution processing system in accordance with a first embodiment of the present invention.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

In accordance with an aspect of the present invention, there is provided a computer program product comprising computer-readable instructions that cause a computer to function as: a command transmission request receiving unit which receives a command transmission request issued by each information processing unit of an information processing device which includes a plurality of information processing units executing information processing based on device information as information on a device; a command transmitting unit which transmits a command corresponding to the command transmission request received by the command transmission request receiving unit to the device via an interface; a device information acquiring unit which acquires the device information supplied from the device as a response to the command; and a device information supplying unit which is configured to supply the device information acquired by the device information acquiring unit to the information processing units as needed.

By letting the computer function as the units described above according to the above computer program product, even device information that can be received from the device only once can be supplied to a plurality of information processing units successfully, by which each information processing unit is allowed to execute the information processing properly based on the device information.

In at least one aspect, the computer program product further comprises computer-readable instructions that cause the computer to function as: a command information storage control unit which stores command information, representing the command corresponding to the command transmission request received by the command transmission request receiving unit, in a storage unit of the computer; and a judgment unit which judges whether or not the device information acquired by the device information acquiring unit corresponds to the command represented by the command information stored in the storage unit. The device information supplying unit supplies the device information acquired by the device information acquiring unit to the information processing units only when the device information is judged by the judgment unit to correspond to the command represented by the command information stored in the storage unit.

By letting the computer function as the units described above according to the above computer program product, even when information other than device information corresponding to (requested by) the command transmitted to the device is erroneously acquired from the device for some reason, such information is not supplied to the information processing units. Therefore, the computer is relieved of a processing load for supplying such useless information to the information processing units, and the information processing units are also relieved of a processing load for processing the useless information.

Incidentally, the computer program product may also be configured differently from the above configuration. For example, the device information supplying unit may be configured to supply any information acquired by the device information acquiring unit to the information processing units even when information other than device information corresponding to the command transmitted to the device is erroneously acquired from the device for some reason. In this case, information irrelevant to the command can be supplied to the information processing units, and thus each information processing unit is required to deal with the supplied information properly by, for example, judging whether the information is device information returned from the device as a response to the command or information irrelevant to the command, selecting necessary information based on the judgment, and using necessary information while discarding unnecessary information.

In at least one aspect, the computer program product further comprises computer-readable instructions that cause the computer to function as: a sender information storage control unit which stores sender information, representing the information processing unit as the sender of the command transmission request received by the command transmission request receiving unit, in a storage unit of the computer; and a selection unit which selects one or more of the information processing units to which the device information judged by the judgment unit to correspond to the command represented by the command information should be supplied, based on the sender information stored in the storage unit. The device information supplying unit supplies the device information judged by the judgment unit to correspond to the command represented by the command information to the one or more information processing units selected by the selection unit.

By letting the computer function as the units described above according to the above computer program product, the device information acquired as a response to the command is supplied only to one or more information processing units that requested the transmission of the command to the device. Therefore, the computer is relieved of a processing load for supplying the device information to information processing units that have not requested the device information, and each information processing unit is also relieved of a processing load for processing such device information not requested by the information processing unit.

Incidentally, the computer program product may also be configured differently from the above configuration. For example, the device information (judged by the judgment unit to correspond to the command represented by the command information) may also be supplied to all the information processing units without making the judgment (selection) regarding whether each information processing unit has requested the transmission of the command or not. In this case, the device information is supplied also to information processing units that have not issued the command transmission request corresponding to the command (i.e. information processing units that have not requested the particular device information). Therefore, each information processing unit is required to deal with the supplied information properly by, for example, judging whether or not the information is device information returned from the device as a response to a command transmitted to the device according to a command transmission request issued by the information processing unit, selecting necessary information based on the judgment, and using necessary information while discarding unnecessary information.

In at least one aspect, the device information supplying unit supplies the device information acquired by the device information acquiring unit to the information processing units asynchronously with timing of the acquisition of the device information by temporarily storing the device information acquired by the device information acquiring unit in a storage area reserved in a storage unit of the computer.

By letting the computer function as the units described above according to the above computer program product, the timing of acquisition of the device information from the device and the timing of supplying the device information to each information processing unit can be made asynchronous with each other thanks to the temporary storing of the device information in the storage area, by which it becomes possible to supply the device information to each information processing unit exactly when the device information has become necessary to the information processing unit.

Further, when the transmission of the same command (for acquiring particular device information) is requested by two or more information processing units, the device information supplied to the first information processing unit (first trying to acquire the device information) has already been stored in the storage area, and thus the device information can be immediately supplied to following information processing units (trying to acquire the device information later).

The it is possible to configure the device information supplying unit to recognize the fact that the device information has become necessary to an information processing unit based on a request or notification from the information processing unit and supply the device information to the information processing unit as a response to the request/notification, or the storage area for storing the device information may be implemented by a shared memory, etc. that can be accessed by the information processing units so that each information processing unit can freely read out the device information from the shared memory when the device information has become necessary.

Incidentally, the computer program product may also be configured differently from the above configuration. For example, the device information supplying unit may also be configured to supply the device information to the information processing units immediately after (in sync with) the acquisition of the device information from the device by the device information acquiring unit. In this case, the device information is supplied to the information processing units irrespective of whether the device information is necessary to each information processing unit or not. Therefore, each information processing unit is required to deal with the supplied device information property by, for example, immediately processing the supplied device information or temporarily storing the supplied device information in a storage area (prepared on the information processing unit's side) so that the supplied device information can be processed later.

In at least one aspect, the device information supplying unit stores the device information acquired by the device information acquiring unit in one of more storage areas reserved respectively for one or more information processing units as senders of the command transmission request received by the command transmission request receiving unit.

By letting the computer function as the units described above according to the above computer program product, device information acquired from the device is stored in the storage areas which are reserved respectively for the information processing units, and thus a problem occurring to a storage area during the use of the device information stored in the storage areas by the information processing units does not affect other storage areas.

In at least one aspect, the device information supplying unit stores the device information acquired by the device information acquiring unit in a corresponding one of multiple storage areas which are reserved respectively for different commands.

By letting the computer function as the units described above according to the above computer program product, device information acquired from the device is stored in the storage areas which are reserved respectively for different commands. Therefore, when device information supplied from the device as a response to a plurality of the same commands is supplied to a plurality of information processing units, it is unnecessary to store the same device information in a plurality of storage areas (differently from the case where the device information is stored in storage areas reserved respectively for a plurality of information processing units), by which memory consumption for the storage areas can be reduced.

In accordance with another aspect of the present invention, there is provided a computer comprising: a command transmission request receiving unit which receives a command transmission request issued by each information processing unit of an information processing device which includes a plurality of information processing units executing information processing based on device information as information on a device; a command transmitting unit which transmits a command corresponding to the command transmission request received by the command transmission request receiving unit to the device via an interface; a device information acquiring unit which acquires the device information supplied from the device as a response to the command; and a device information supplying unit which is configured to supply the device information acquired by the device information acquiring unit to the information processing units as needed.

In at least one aspect, the computer further comprises: a command information storage control unit which stores command information, representing the command corresponding to the command transmission request received by the command transmission request receiving unit, in a storage unit of the computer; and a judgment unit which judges whether or not the device information acquired by the device information acquiring unit corresponds to the command represented by the command information stored in the storage unit. The device information supplying unit supplies the device information acquired by the device information acquiring unit to the information processing units only when the device information is judged by the judgment unit to correspond to the command represented by the command information stored in the storage unit.

In at least one aspect, the computer further comprises: a sender information storage control unit which stores sender information, representing the information processing unit as the sender of the command transmission request received by the command transmission request receiving unit, in a storage unit of the computer; and a selection unit which selects one or more of the information processing units to which the device information judged by the judgment unit to correspond to the command represented by the command information should be supplied, based on the sender information stored in the storage unit. The device information supplying unit supplies the device information judged by the judgment unit to correspond to the command represented by the command information to the one or more information processing units selected by the selection unit.

In at least one aspect, the device information supplying unit supplies the device information acquired by the device information acquiring unit to the information processing units asynchronously with timing of the acquisition of the device information by temporarily storing the device information acquired by the device information acquiring unit in a storage area reserved in a storage unit of the computer.

In at least one aspect, the device information supplying unit stores the device information acquired by the device information acquiring unit in one of more storage areas reserved respectively for one or more information processing units as senders of the command transmission request received by the command transmission request receiving unit.

In at least one aspect, the device information supplying unit stores the device information acquired by the device information acquiring unit in a corresponding one of multiple storage areas which are reserved respectively for different commands.

With the above computers comprising the same units as those implemented by the above computer program products, effects similar to those of the above computer program products can be achieved.

In accordance with another aspect of the present invention, there is provided an information distribution processing method comprising: a command transmission request receiving step of receiving a command transmission request issued by each information processing unit of an information processing device which includes a plurality of information processing units executing information processing based on device information as information on a device; a command transmitting step of transmitting a command corresponding to the command transmission request received by the command transmission request receiving step to the device via an interface; a device information acquiring step of acquiring the device information supplied from the device as a response to the command; and a device information supplying step of supplying the device information acquired by the device information acquiring step to the information processing units as needed.

In at least one aspect, the information distribution processing method further comprises: a command information storage control step of storing command information, representing the command corresponding to the command transmission request received by the command transmission request receiving step, in a storage unit; and a judgment step of judging whether or not the device information acquired by the device information acquiring step corresponds to the command represented by the command information stored in the storage unit. The device information supplying step supplies the device information acquired by the device information acquiring step to the information processing units only when the device information is judged by the judgment step to correspond to the command represented by the command information stored in the storage unit.

In at least one aspect, the information distribution processing method further comprises: a sender information storage control step of storing sender information, representing the information processing unit as the sender of the command transmission request received by the command transmission request receiving step, in a storage unit; and a selection step of selecting one or more of the information processing units to which the device information judged by the judgment step to correspond to the command represented by the command information should be supplied, based on the sender information stored in the storage unit. The device information supplying step supplies the device information judged by the judgment step to correspond to the command represented by the command information to the one or more information processing units selected by the selection step.

In at least one aspect, the device information supplying step supplies the device information acquired by the device information acquiring step to the information processing units asynchronously with timing of the acquisition of the device information by temporarily storing the device information acquired by the device information acquiring step in a storage area reserved in a storage unit.

In at least one aspect, the device information supplying step stores the device information acquired by the device information acquiring step in one of more storage areas reserved respectively for one or more information processing units as senders of the command transmission request received by the command transmission request receiving step.

In at least one aspect, the device information supplying step stores the device information acquired by the device information acquiring step in a corresponding one of multiple storage areas which are reserved respectively for different commands.

With the above information distribution processing methods comprising the steps equivalent to those implemented by the above computer program products, effects similar to those of the above computer program products can be achieved.

In accordance with another aspect of the present invention, there is provided an information distribution processing system comprising: a computer capable of communicating with a device; and an information processing device which is implemented by the computer or placed separately from the computer to be capable of data communication with the computer. The information processing device includes a plurality of information processing units which execute information processing based on device information as information on the device. The computer includes: a command transmission request receiving unit which receives a command transmission request issued by each information processing unit of the information processing device; a command transmitting unit which transmits a command corresponding to the command transmission request received by the command transmission request receiving unit to the device via an interface; a device information acquiring unit which acquires the device information supplied from the device as a response to the command; and a device information supplying unit which is configured to supply the device information acquired by the device information acquiring unit to the information processing units as needed.

The information distribution processing system may be configured to further comprise the device supplying the device information to the device information acquiring unit.

With the above information distribution processing systems comprising the same units of the computer as those implemented by the above computer program products, effects similar to those of the above computer program products can be achieved.

Embodiment

Referring now to the drawings, a description will be given in detail of preferred embodiments in accordance with the present invention.

First Embodiment

FIG. 1 is a block diagram showing the overall composition of an information distribution processing system in accordance with a first embodiment of the present invention. The information distribution processing system of FIG. 1 includes a PC (Personal Computer) 1 and a device 2. The device 2 in this embodiment is an MFP (Multi Function Peripheral) having the printer function, image scanner function, copy function, facsimile function and telephone function in one body.

As shown in FIG. 1, the PC 1 includes a CPU (Central Processing Unit) 11, a ROM (Read Only Memory) 12, a RAM (Random Access Memory) 13, an HDD (Hard Disk Drive) 14, an operation unit 15, a display unit 16, a USB I/F (Universal Serial Bus Interface) 17, etc.

The CPU 11 is a unit which controls the components of the PC 1 and executes various calculations according to programs stored in the ROM 12 and the RAM 13.

The ROM 12, retaining its memory contents even when the PC 1 is turned OFF, stores a BIOS (Basic Input Output System) and various read-only data which are generally not updated. The RAM 13 is a storage device directly accessed and used by the CPU 11 as the main memory of the PC 1. A variety of software (OS (Operating System), application programs, etc.) is loaded from the HDD 14 to the RAM 13. The HDD 14 is a storage device for storing the OS, various application programs and various data files. The operation unit 15, as an input device for receiving various instructions from the user, includes a keyboard and pointing devices (e.g. mouse), for example. The display unit 16, as an output device for presenting a variety of information to the user, is implemented by an LCD (Liquid Crystal Display) capable of displaying color images, for example.

The USB I/F 17 is a serial interface in conformity with the USB standard, to which various devices (printer, keyboard, mouse, scanner, speaker, various storage devices, etc.) can be connected. In this embodiment, the device 2 (MFP) is connected to the USB I/F 17.

The OS installed in the PC 1 in this embodiment has the multitask function. Such an OS having the multitask function can be Windows®, Linux® or MacOS®, for example.

Thanks to the multitask function of the OS, the CPU 11 of the PC 1 is capable of executing a plurality of processes (according to a plurality of programs) in parallel in the time-sharing manner, by which a plurality of information processing units and an information distribution unit (explained in detail later) can operate and function in parallel on the PC 1. Further, a USB controller (implementing communication with the device 2 via the USB I/F 17), a print spooler (managing print data to be outputted to the device 2 as a print job), etc. function on the PC 1 as standard functions of the OS.

While detailed explanation of well-known functions provided by the OS is omitted here, the following description will be given assuming that the PC 1 has various functions provided by Windows®.

As shown in FIG. 1, the device 2 includes a CPU 21, a ROM 22, a RAM 23, an HDD 24, operation keys 25, a display panel 26, a USB I/F 27, a nonvolatile RAM 28, a printing unit 29, a scanning unit 30, a modem 31, etc.

The CPU 21 is a unit which controls the components of the device 2 and executes various calculations according to control programs stored in the ROM 22. The ROM 22, retaining its memory contents even when the device 2 is turned OFF, stores the control programs and various read-only data which are generally not updated. The RAM 23 is a storage device directly accessed and used by the CPU 21 as the main memory of the device 2. Various data (calculation results) generated by the CPU 21 during processes are temporarily stored in the RAM 23.

The HDD 24 is a storage device for storing image data of relatively large data sizes, such as image data transmitted and received by the facsimile function, image data generated by image scanning by the image scanner function, and image data to be printed out by the printer function. The operation keys 25 are an input device operated by the user for manually inputting instructions to the device 2. The display panel 26, implemented by a small-sized LCD (Liquid Crystal Display), is capable of displaying information on the settings, status, etc. of the device 2. The USB I/F 27 is a serial interface in conformity with the USB standard, through which data communication with the PC 1 is implemented.

The nonvolatile RAM 28 is a storage device for storing data that have to be retained even when electric power supply to the device 2 stops (e.g. data regarding the settings of the device 2).

The printing unit 29 is a unit capable of executing printing on a sheet-like print medium (e.g. paper). The printing unit 29 is activated for printing of print data by the printer function, printing of image data received by the facsimile function, printing of a copy image by the copy function, etc.

The scanning unit 30 is a unit capable of reading an image from a document (set in an unshown ADF (Automatic Document Feeder) or placed on contact glass of a flat bed) by image scanning. The scanning unit 30 is activated for image scanning by the image scanner function, scanning of an image to be transmitted by the facsimile function, etc.

The modem 31 is a device for converting digital data generated by the device 2 into audio signals and transmitting the audio signals to a public circuit while converting audio signals received from the public circuit into digital data that can be processed by the device 2. The modem 31 is activated for communication of image data by the facsimile function, telephone calls by the telephone function, etc.

Next, the outline of device information acquisition by the PC 1 will be explained.

Figure 2:
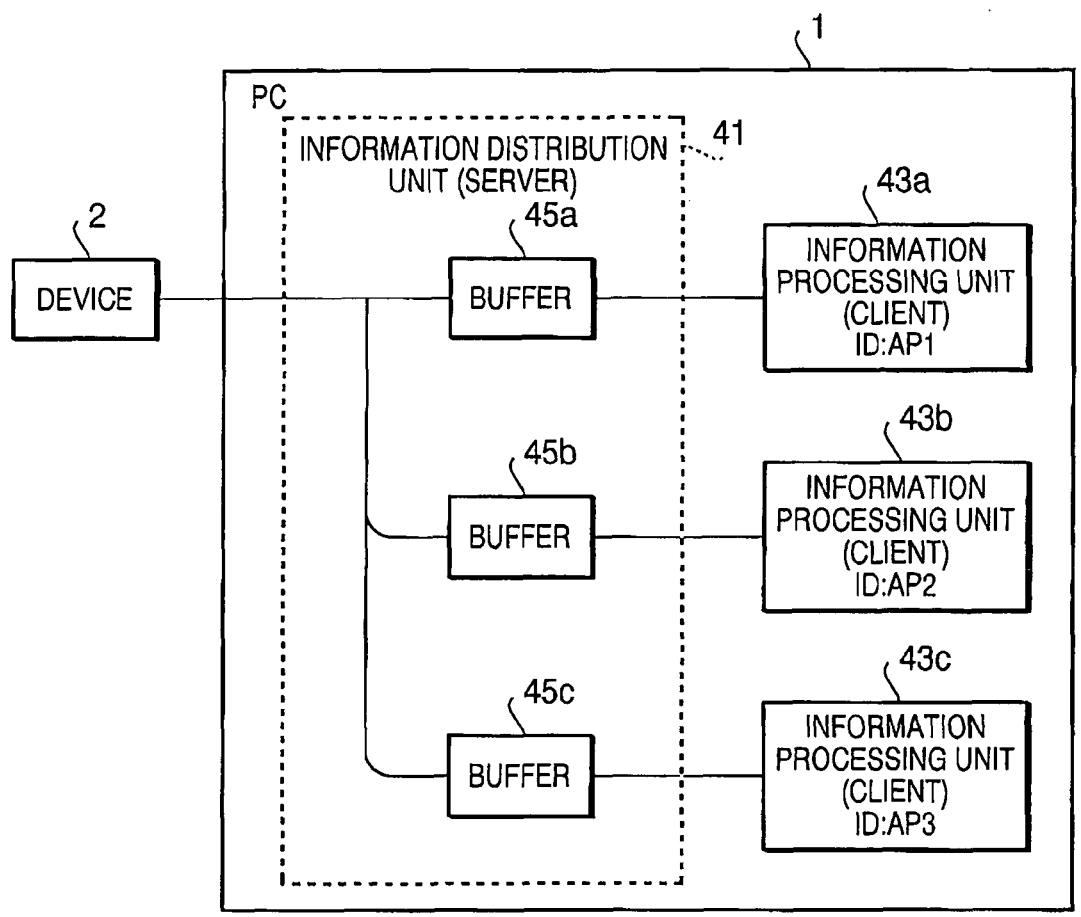
FIG. 2 is a schematic diagram showing a method for distributing device information employed in the first embodiment.

As mentioned above, the CPU 11 of the PC 1 is capable of executing a plurality of processes (according to a plurality of programs) in parallel in the time-sharing manner, by which a plurality of units such as an information distribution unit 41 and information processing units 43a-43c shown in FIG. 2 can function in parallel on the PC 1.

Among the above units, the information distribution unit 41 functions as a "server" while each of the information processing units 43a-43c functions as a "client". The information distribution unit 41 acquires device information on the device 2 from the device 2 according to a request from an information processing unit 43 (43a, 43b or 43c), and supplies the acquired device information to the information processing unit in response to a request from the information processing unit. Meanwhile, each information processing unit 43a-43c executes a variety of information processing by use of the device information on the device 2 supplied from the information distribution unit 41. Specifically, the information processing executed by each information processing unit 43a-43c can be, for example, a status monitor process of displaying the status of the device 2 on the display unit 16 substantially in real time based on the acquired device information, a process for displaying the serial number, firmware version, etc. of the device 2 on the display unit 16 based on the acquired device information, etc. Incidentally, while three information processing units 43a-43c are shown in FIG. 2 as an example, the number of information processing units functioning in parallel is not particularly limited. The timing of starting and ending each process by each information processing unit 43a-43c may be set freely and independently by each information processing unit 43a-43c.

Meanwhile, the device 2 has a function of supplying a variety of device information on the device 2 itself to the PC 1 in response to a request from the PC 1. Since the device 2 is an MFP in this embodiment, the device information supplied from the device 2 to the PC 1 can include information about device status (online/offline, etc.), information about frequency of use (the number of copies regarding each sheet size, the total number of copies, etc.), information about the use of replacement parts (drum replacement period, etc.), information about consumption of consumable items (the remaining amount of toner, ink, sheets, etc.) and information about the number of occurrences of trouble (the number of paper jams, etc.), for example. Which of the above information should be supplied to the PC 1 is specified by the command supplied from the PC 1.

In this embodiment, the PC 1 transmits a PJL command to the device 2 for requesting device information from the device 2. The PJL (Printer Job Language) is a well-known command language prepared for controlling various functions of a printer. The PJL was developed by Hewlett-Packard Co. and has been employed by many companies since then.

For the transmission of a PJL command to the device 2, the PC 1 executes a process similar to that for outputting print data to the device 2. Specifically, when an information processing unit 43 (43a, 43b or 43c) functioning on the PC 1 sends a command transmission request to the information distribution unit 41, the information distribution unit 41 outputs a particular PJL command according to the command transmission request. The PJL command outputted by the information distribution unit 41 is handed over to the print spooler via a printer driver, and the print spooler processes the received PJL command as a print job. Consequently, the PJL command is transmitted to the device 2 via the USB I/F 17.

The device 2, receiving the PJL command similarly to the reception of ordinary print data, recognizes that the received data is a PJL command based on header information in the data and analyzes the contents of the PJL command. When the device 2 judges that it can respond to the PJL command based on the analysis, the device 2 reads out device information from the nonvolatile RAM 28 and transmits the device information to the PC 1.

The PC 1 reads back the device information returned from the device 2. Specifically, in the PC 1 which is connected to the device 2 via the USB I/F 17, the information distribution unit 41 carries out the reception of expected information by repeating a reception process when the amount of information received is 0. When data of some type is received, the information distribution unit 41 checks whether the received data is expected device information or not. If the received data is not the expected device information, the information distribution unit 41 repeats the reception process, by which the expected device information is acquired eventually.

The information distribution unit 41 which acquired the device information from the device 2 stores the device information in buffers 45*a*-45*c* which have been prepared corresponding to the information processing units 43*a*-43*c*. Thus, the same device information is stored in the three buffers 45*a*-45*c* corresponding to the information processing units 43*a*-43*c*.

When a device information read request (read request requesting the reading of device information) is received from one of the information processing units 43*a*-43*c* (e.g. information processing unit 43*a*), the information distribution unit 41 sends the device information stored in a buffer (e.g. buffer 45*a*) corresponding to the requesting client (e.g. information processing unit 43*a*) to the requesting client.

Consequently, the requesting client (e.g. information processing unit 43*a*) successfully acquiring the device information can execute information processing (e.g. a process of displaying the status of the device 2 on the display unit 16) based on the acquired device information.

Incidentally, while the communication of a PJL command and device information is executed between the PC 1 and the device 2 according to the scheme explained above, the device 2 (supplying device information in response to a request (PJL command) from the PC 1) does not recognize which of the information processing units 43*a*-43*c* is the requesting client. Therefore, when the PC 1 reads out device information from the device 2, the device 2 supplies all device information which has been requested by the PC 1 so far to the PC 1. Due to such a configuration, even when the information processing units 43*a*-43*c* have issued requests for the acquisition of device information and the device 2 has prepared all device information that should be returned to the PC 1 as a response to the requests, if the readout from the device 2 is executed independently by the information processing unit 43*a* for example, even device information that should be transmitted to other information processing units 43*b* and 43*c* is transmitted to the information processing unit 43*a* and the already-transmitted device information is deleted from a transmission buffer of the device 2. In this case, even if the readout from the device 2 is executed later by the information processing unit 43*b* or 43*c*, the information processing units 43*b* and 43*c* can not receive necessary device information.

The information distribution unit 41 in this embodiment is provided in order to prevent the above problem. Specifically, while the device 2 prepares all device information that should be returned to the PC 1 as a response to requests (for the acquisition of device information) that have been issued by the information processing units 43*a*-43*c* as mentioned above, the information distribution unit 41 in this embodiment executes the readout from the device 2 as the representative of the information processing units 43*a*-43*c* and copies the acquired device information to the three buffers 45*a*-45*c* corresponding to the information processing units 43*a*-43*c*. Meanwhile, each information processing unit 43*a*-43*c* is supplied with the device information necessarily from the information distribution unit 41, without independently executing the readout from the device 2. Incidentally, when the device information stored in the buffer 45*a* is supplied from the information distribution unit 41 to the information processing unit 43*a* for example, the already-transmitted device information is deleted from the buffer 45*a*. However, the copied device information remains in the other buffers 45*b* and 45*c*, and thus the other information processing units 43*b* and 43*c* can receive the device information from the information distribution unit 41.

Figure 3:
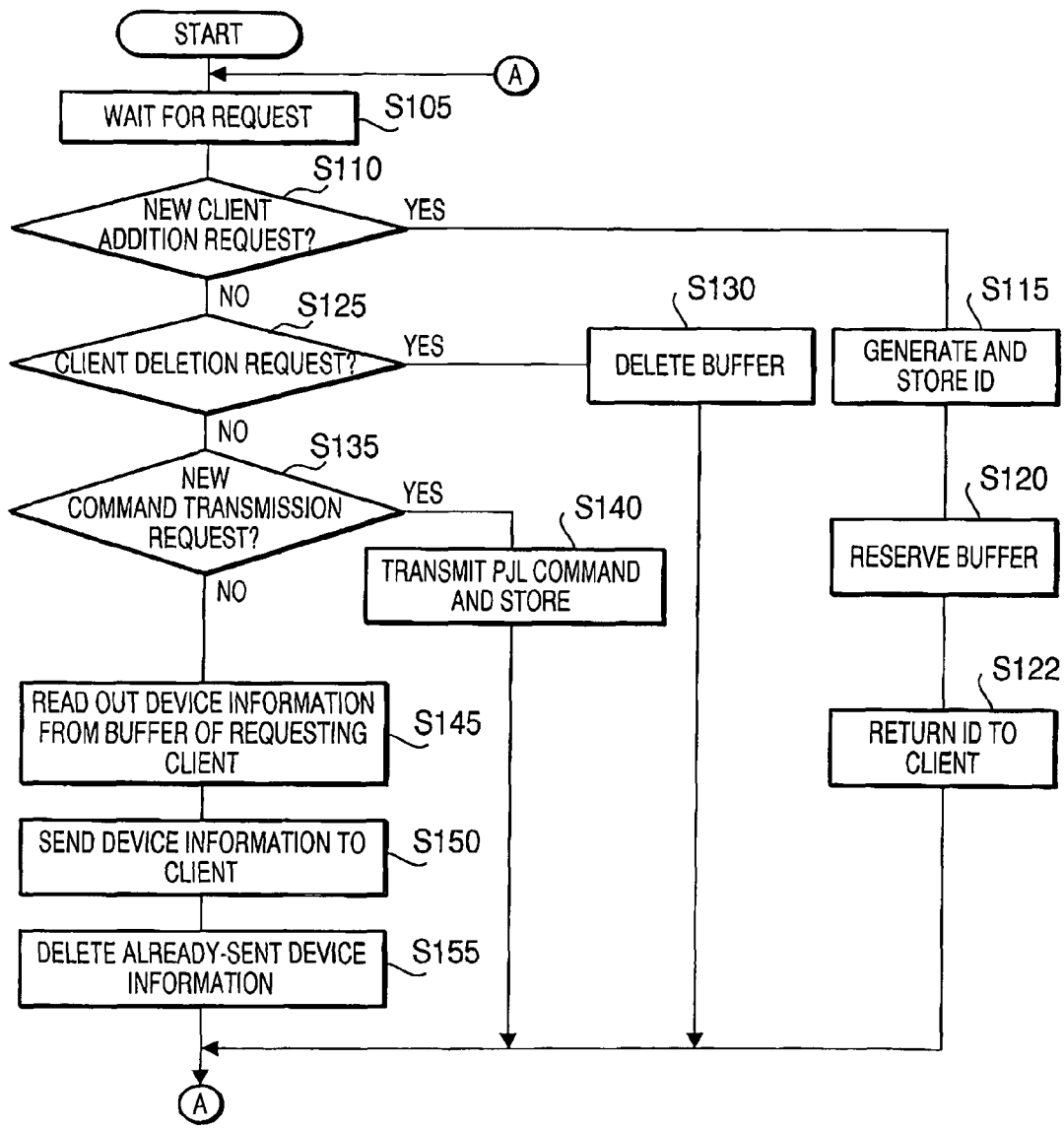
FIG. 3 is a flow chart showing a main process executed by an information distribution unit of the PC in the first embodiment.

Next, a main process executed by the information distribution unit 41 for implementing its own functions described above will be explained in detail referring to a flow chart of FIG. 3. The main process of FIG. 3, which has to be started before the functions of the information distribution unit 41 becomes necessary, may be started at the startup of the PC 1, for example.

At the start of the main process, the CPU 11 functioning as the information distribution unit 41 (hereinafter simply referred to as "the information distribution unit 41") waits for a request from an information processing unit 43 (43*a*, 43*b* or 43c) as a client (S105). When a request from an information processing unit 43 is received, the information distribution unit 41 judges whether the received request is a new client addition request or not (S110).

If the received request is a new client addition request (S110: YES), the information distribution unit 41 stores an ID of the requesting client in the RAM 13 (S115). The ID as a value unique to the client is generated by the information distribution unit 41 for each new client addition request. The ID will be transferred to the client as a return value when a process meeting the new client addition request from the client is completed by the information distribution unit 41 (in step S122 explained later). From then on, the client issuing other requests (client deletion request, new command transmission request, device information read request, etc., explained later) specifies the ID in each request, by which the client can inform the information distribution unit 41 that the target of processing (in regard to the request) is the client. In the example of FIG. 2, the information processing units 43*a*-43*c* as clients have been assigned unique IDs AP1-AP3, respectively. From then on, each request issued by the information processing unit 43*a* contains the ID "AP1", and the information distribution unit 41 receiving a request containing the ID "AP1"from a client can recognize that the request is from the information processing unit 43a, for example. After finishing the step S115, the information distribution unit 41 reserves a buffer (one of the buffers 45*a*-45*c* shown in FIG. 2) corresponding to the requesting client (S120). For example, the buffer 45*a* is reserved in S120 when the new client addition request is issued by the information processing unit 43*a*. Subsequently, the information distribution unit 41 transfers the ID to the client as the return value as mentioned above (S122) and thereafter returns to the step S105 to repeat the process from S105. Incidentally, each buffer 45a-45c reserved by the information distribution unit 41 is managed being associated with the ID (of the information processing unit 43a-43c corresponding to the buffer 45a-45c) generated and stored in the step S115. In short, the buffers are managed so that each buffer can be specified by specifying a corresponding ID.

On the other hand, if the received request is not a new client addition request (S110: NO), the information distribution unit 41 judges whether the received request is a client deletion request or not (S125).

If the received request is a client deletion request (S125: YES), the information distribution unit 41 deletes a buffer corresponding to the requesting client (S130). The client deletion request is issued by the client while specifying the ID assigned to the client in S115, and thus the information distribution unit 41 deletes a buffer associated with the specified ID in the step S130. For example, when the client deletion request is issued by the information processing unit 43a, the buffer 45a is deleted in S130. After finishing the step S130, the information distribution unit 41 returns to the step S105 to repeat the process from S105.

On the other hand, if the received request is not a client deletion request (S125: NO), the information distribution unit 41 judges whether the received request is a new command transmission request or not (S135). In this embodiment, a command transmission request containing a PJL command is sent from each client (information processing unit 43a-43c) together with the ID representing the client. However, each client may also be configured to send a command transmission request containing a PJL identifier (representing a particular PJL command) to the information distribution unit 41. In this case, the information distribution unit 41 prepares a particular PJL command corresponding to the PJL identifier sent from the client.

If the received request is a new command transmission request (S135: YES), the information distribution unit 41 transmits a PJL command (requested by the new command transmission request to be transmitted) to the device 2 via the spooler and the USB I/F 17 and stores the PJL command in the RAM 13 while associating the PJL command with the ID of the client (S140). The PJL command stored in the RAM 13 in the step S140 will be referred to in a judgment step S215 which will be explained later. After finishing the step S140, the information distribution unit 41 returns to the step S105 to repeat the process from S105.

On the other hand, if the received request is not a new command transmission request (S135: NO), the information distribution unit 41 in this embodiment judges that the received request is a device information read request from a client. In other words, the main process of FIG. 3 is executed on the assumption that a request that is not a new client addition request, a client deletion request nor a new command transmission request is a device information read request. In this case, the information distribution unit 41 searches a buffer corresponding to the requesting client based on the ID specified by the client, reads out device information which has been stored (in a resident thread process which will be explained later) in the buffer (S145), and sends the device information to the requesting client (S150). For example, when the device information read request is received from the information processing unit 43a, device information is read out from the buffer 45a in the step S 145 and the device information is sent to the information processing unit 43a (requesting client) in the step S150. Incidentally, the device information read out from the buffer in the step S145 is device information that has been read out from the device 2 and stored in the buffer by the resident thread process (explained in detail below) which is executed in parallel with the main process of FIG. 3.

After finishing the step S150, the information distribution unit 41 deletes the already-sent device information from the buffer corresponding to the requesting client (S155) and thereafter returns to the step S105 to repeat the process from S105.

Next, the resident thread process executed by the information distribution unit 41 in parallel with the main process of FIG. 3 will be explained in detail referring to a flow chart of FIG. 4.

At the start of the resident thread process, the information distribution unit 41 reads out device information from the device 2 (S205). Incidentally, when the device 2 is not in a state for transmitting device information (e.g. when no PJL command has been transmitted to the device 2), the information distribution unit 41 waits in the step S205 until device information can be read out. When certain information is read out from the device 2, the step S205 is finished.

Subsequently, the information distribution unit 41 selects an ID of a client as the target of processing (hereinafter referred to as a "processing target client") from IDs of yet unprocessed clients in order to process all the clients in turn in a loop process which will be explained below (S210). The "IDs corresponding to yet unprocessed clients" means IDs (among all the IDs stored in the RAM 13 in S115) that have not been selected yet in the step S210.

After finishing the step S210, the information distribution unit 41 judges whether or not the information read out from the device 2 in S205 is a response to a PJL command transmitted to the device 2 according to a request of the processing target client (client corresponding to the ID selected in S210) (S215). Each PJL command transmitted to the device 2 according to the client's request has been stored in the RAM 13 in the aforementioned step S140, and thus the information distribution unit 41 in the step S215 can judge whether the information read out from the device 2 in S205 is expected device information or not by comparing the information with each PJL command stored in the RAM 13 in S140.

If the information is not a response to a PJL command transmitted to the device 2 according to the processing target client's request (S215: NO), the information distribution unit 41 returns to the step S210 to repeat the loop process from S210.

On the other hand, if the information is a response to a PJL command transmitted to the device 2 according to the processing target client's request (S215: YES), the information distribution unit 41 judges whether the buffer corresponding to the ID selected in S210 has a sufficient free area or not (S220). If the buffer does not have a sufficient free area (S220: YES), the information distribution unit 41 reserves a sufficient free area in the buffer by discarding (deleting) old device information (S225). If the buffer has a sufficient free area (S220: NO), the information distribution unit 41 skips the step S225.

Subsequently, the information distribution unit 41 writes (by appending) the device information read out from the device 2 in S205 in the buffer corresponding to the ID selected in S210 (S230). By repeating the step S230 for all the clients (information processing units 43a-43c) by the loop process, the device information is stored in the buffers 45a-45c. The device information will be read out from the buffer 45a, 45b or 45c in the aforementioned step S145. Thereafter, the information distribution unit 41 deletes the information on the correspondence between the PJL command and the ID (stored in S140) from the RAM 13 (S232). In the step S232, the information distribution unit 41, judging that the process regarding the request command (PJL command) has been completed, deletes the information regarding the request command. Incidentally, when the request command (PJL command) is a PJL command "USTATUS", the step S232 is skipped since the one-to-one correspondence between the request command (PJL command) and the response data from the device 2 does not hold in the case of "USTATUS" and the process can not be judged to have been 20. completed.

After finishing the step S232, the information distribution unit 41 checks whether or not the loop process from S210 has been finished for all the IDs stored in the RAM 13 in S115 (S235). If the loop process has not been finished for all the IDs (S235: NO), the information distribution unit 41 returns to the step S210 to repeat the loop process of S210-S235.

On the other hand, if the loop process has been finished for all the IDs stored in the RAM 13 in S 115 (S235: YES), the information distribution unit 41 determines whether or not to end the resident thread process (S240). If the resident thread process should be ended (S240: YES), the information distribution unit 41 ends the resident thread process of FIG. 4. If the resident thread process should not be ended (S240: NO), the information distribution unit 41 waits 1 second (S245) and thereafter returns to the step S205 to repeat the process from S205.

In the above resident thread process executed by the information distribution unit 41, the loop process (S210-S235) is executed for all the clients (i.e. for all the IDs) each time device information is read out from the device 2 in the step S205. By the repetition of the loop process for all the clients, the device information read out from the device 2 is distributed to all the buffers 45a- 45c corresponding to all the clients (information processing units 43a-43c). After the distribution of the device information is completed, the information distribution unit 41 waits 1 second (S245) and thereafter repeats the process from the device information reading step S205.

Figure 5:
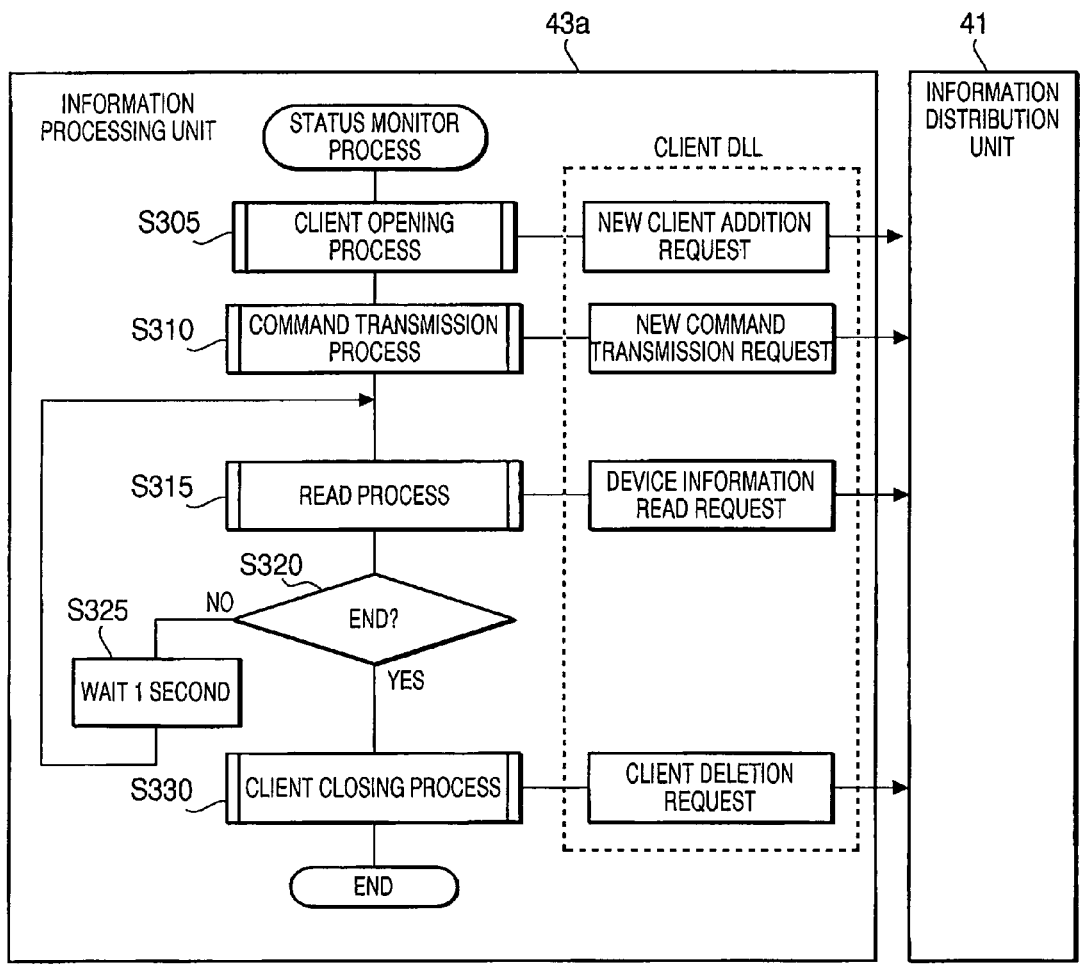
FIG. 5 is a flow chart showing a status monitor process executed by an information processing unit of the PC in the first embodiment.

Next, a status monitor process which is executed by each information processing unit, as an example of a process executed by each information processing unit, will be explained in detail referring to a flow chart of FIG. 5. Incidentally, the following explanation of the status monitor process will be given taking a case where the process is executed by the information processing unit 43a for example.

The function letting each information processing unit 43a-43c make a request to the information distribution unit 41 is a common function which is used by the information processing units 43a-43c in common, and thus the requesting function is provided as a client DLL (Dynamic Link Library). Each information processing unit 43a-43c can use the requesting function (for making a request to the information distribution unit 41) by dynamically linking (presenting a link to) the client DLL. The communication between the client DLL and the information distribution unit 41 is executed employing an already-existing interprocess communication function such as the RPC (Remote Procedure Call) of Windows®.

At the start of the status monitor process, the CPU 11 functioning as the information processing unit 43a (hereinafter simply referred to as "the information processing unit 43a") executes a client opening process (S305). The client opening process is a process of reserving a buffer (necessary for starting a process as the status monitor), initializing various data, etc. In the client opening process, the information processing unit 43a sends the new client addition request to the information distribution unit 41. When the new client addition request is received by the information distribution unit 41 (S105 in FIG. 3), the steps S110-S120 in FIG. 3 are executed by the information distribution unit 41.

An ID is returned from the information distribution unit 41 as the return value in response to the new client addition request, as mentioned above. The ID will be attached to each request (explained later) issued by the information processing unit 43a as an argument.

After finishing the step S305, the information processing unit 43a executes a command transmission process (S310). The command transmission process includes the transmission of a PJL command. The transmission of a PJL command is executed by use of the client DLL, by which the aforementioned new command transmission request containing the PJL command is sent to the information distribution unit 41. When the new command transmission request is received by the information distribution unit 41 (S105 in FIG. 3), the steps S135-S140 in FIG. 3 are executed by the information distribution unit 41.

After transmitting the PJL command, the information processing unit 43a executes a read process (S315). The read process includes acquisition of device information from the information distribution unit 41, displaying of a screen on the display unit 16 based on the latest device information acquired from the information distribution unit 41, etc. In the read process, the information processing unit 43a issues the aforementioned device information read request by use of the client DLL. When the device information read request is received by the information distribution unit 41 (S105 in FIG. 3), the steps S145 - S155 in FIG. 3 are executed by the information distribution unit 41, by which the device information stored in the buffer 45a corresponding to the information processing unit 43a is supplied from the information distribution unit 41.

After finishing the step S315, the information processing unit 43a judges whether to end the status monitor process or not (S320). If the status monitor process should not be ended (S320: NO), the information processing unit 43a waits 1 second (S325) and thereafter returns to the step S315 to repeat the process from S315, by which the information processing unit 43a repeats the issuance of the device information read request, the acquisition of the latest device information, and the displaying of the screen on the display unit 16 based on the latest device information.

On the other hand, if the status monitor process should be ended (S320: YES), the information processing unit 43a executes a client closing process (S330). The client closing process includes the deletion (release) of the buffer, etc. which is necessary for ending the process as the status monitor. In the client closing process, the information processing unit 43a issues the aforementioned client deletion request to the information distribution unit 41. When the client deletion request is received by the information distribution unit 41 (S105 in FIG. 3), the steps S125-S130 in FIG. 3 are executed by the information distribution unit 41. After finishing the step S330, the status monitor process of FIG. 5 is ended.

As described above, in the first embodiment, even when device information on the device 2 can be received from the device 2 only once, the device information is acquired by the information distribution unit 41 and copied to the buffers 45a-45c corresponding to all the information processing units 43a-43c. Therefore, the device information can be supplied to all the information processing units 43a-43c successfully, by which each information processing unit 43a-43c is allowed to execute information processing properly by use of the device information.

Further, even when information other than device information corresponding to (requested by) a PJL command transmitted by the information distribution unit 41 to the device 2 is erroneously acquired from the device 2 for some reason, the information distribution unit 41 does not supply such information to the information processing units 43a-43c (S215), by which the PC 1 is relieved of a processing load for supplying such useless information to the information processing units 43a-43c (i.e. processing load for executing the steps S220-S230) and the information processing units 43a-43c are also relieved of a processing load for processing the useless information. Such information erroneously acquired from the device 2 for some reason can include, for example, device information transmitted from the device 2 in response to a PJL command that is directly transmitted to the device 2 by a type of application (that directly transmits PJL commands to the device 2 not via the information distribution unit 41) when such an application is included in the application programs stored in the HDD 14. While it is essentially desirable to exclude such an application, the information distribution unit 41 in the first embodiment is capable of preventing such useless information from being supplied to the information processing units 43a-43c as the next best solution even when such an application is included in the application programs.

In the first embodiment, the device information acquired from the device 2 (in response to the PJL command transmitted by the information distribution unit 41) is temporarily stored in the buffers 45a-45c. Therefore, the timing of acquisition of the device information from the device 2 and the timing of supplying the device information to each information processing unit 43a-43c can be made asynchronous with each other, by which it becomes possible to supply the device information to each information processing unit 43a-43c exactly when the device information has become necessary to the information processing unit 43a-43c.

Since the acquired device information is stored in the buffers 45a-45c reserved for the information processing units 43a-43c in the first embodiment, a problem occurring to a storage area of one buffer (e.g. the buffer 45a) during the use of the device information stored in the buffers 45a-45c by the information processing units 43a-43c does not affect other buffers (e.g. the buffers 45b and 45c).

Second Embodiment

In the following, a second embodiment in accordance with the present invention will be described, wherein the difference from the first embodiment will be mainly explained in detail since part of the configuration of the second embodiment is in common with the first embodiment. Specifically, the composition of the PC 1 and the device 2 and the process executed by each information processing unit 43a-43c are in common with the first embodiment and thus repeated explanation thereof is omitted for brevity. Reference characters identical with those in the first embodiment represent elements identical or equivalent to those of the first embodiment.

First, the outline of device information acquisition executed by the PC 1 in the second embodiment will be explained. In the second embodiment, the information distribution unit 41 and the information processing units 43a-43c operate and function on the PC 1 similarly to the first embodiment. However, the structure of the buffer reserved by the information distribution unit 41 differs from that in the first embodiment.

Specifically, while the information distribution unit 41 in the first embodiment reserves a plurality of buffers 45a-45c by reserving one buffer for each of the information processing units 43a-43c, the information distribution unit 41 in the second embodiment reserves only one buffer 47, in which multiple groups (pairs) of storage areas corresponding to different PJL commands are reserved successively. In each storage area group (pair) corresponding to each PJL command, device information transmitted from the device 2 in response to the PJL command and the ID(s) of one or more clients (information processing units) that requested the transmission of the PJL command are stored.

Here, the usage of the buffer 47 will be described taking some concrete examples.

When the information distribution unit 41 is requested by the information processing unit 43a to transmit a PJL command "@PJL1 INFO STATUS", the information distribution unit 41 reserves a group (pair) of storage areas (storage area group) corresponding to "@PJL1 INFO STATUS" in the buffer 47. When device information as a response to the PJL command "@PJL1 INFO STATUS" is acquired from the device 2, the acquired device information and the ID (AP1) of the client (information processing unit 43a) that requested the transmission of the PJL command "@PJL1 INFO STATUS" are stored in the storage area group corresponding to "@PJL1 INFO STATUS" reserved in the buffer 47.

Thereafter, when the information distribution unit 41 is requested by the information processing unit 43b to transmit the same PJL command "@PJL1 INFO STATUS", the information distribution unit 41 does not reserve a new storage area group since the storage area group corresponding to "@PJL1 INFO STATUS" has already been reserved in the buffer 47. When device information in response to the PJL command "PJL1 INFO STATUS" is acquired from the device 2, the acquired device information and the IDs (AP1 and AP2) of the clients (information processing units 43a and 43b) that requested the transmission of the PJL command "@PJL1 INFO STATUS" are stored in the storage area group corresponding to "@PJL1 INFO STATUS" reserved in the buffer 47.

As above, even when command transmission is requested by two or more clients, the information distribution unit 41 does not reserve a new storage area group in the buffer 47 when the clients are requesting the transmission of the same command. In this case, only the ID of each client issuing the request (for the transmission of the same command) after the first client is additionally registered in the storage area already reserved for IDs.

On the other hand, when the information distribution unit 41 is requested by the information processing unit 43a to transmit a PJL command "@PJL2 INFO PAGE", the information distribution unit 41 reserves a new storage area group corresponding to "@PJL2 INFO PAGE" in the buffer 47. When device information in response to the PJL command "@PJL2 INFO PAGE" is acquired from the device 2, the acquired device information and the ID (AP1) of the client (information processing unit 43a) that requested the transmission of the PJL command "@PJL2 INFO PAGE" are stored in the storage area group corresponding to "@PJL2 INFO PAGE" reserved in the buffer 47.

As above, even when command transmission is requested by the same client, the information distribution unit 41 reserves a new storage area group in the buffer 47 when the client is requesting the transmission of a different command.

Figure 6:
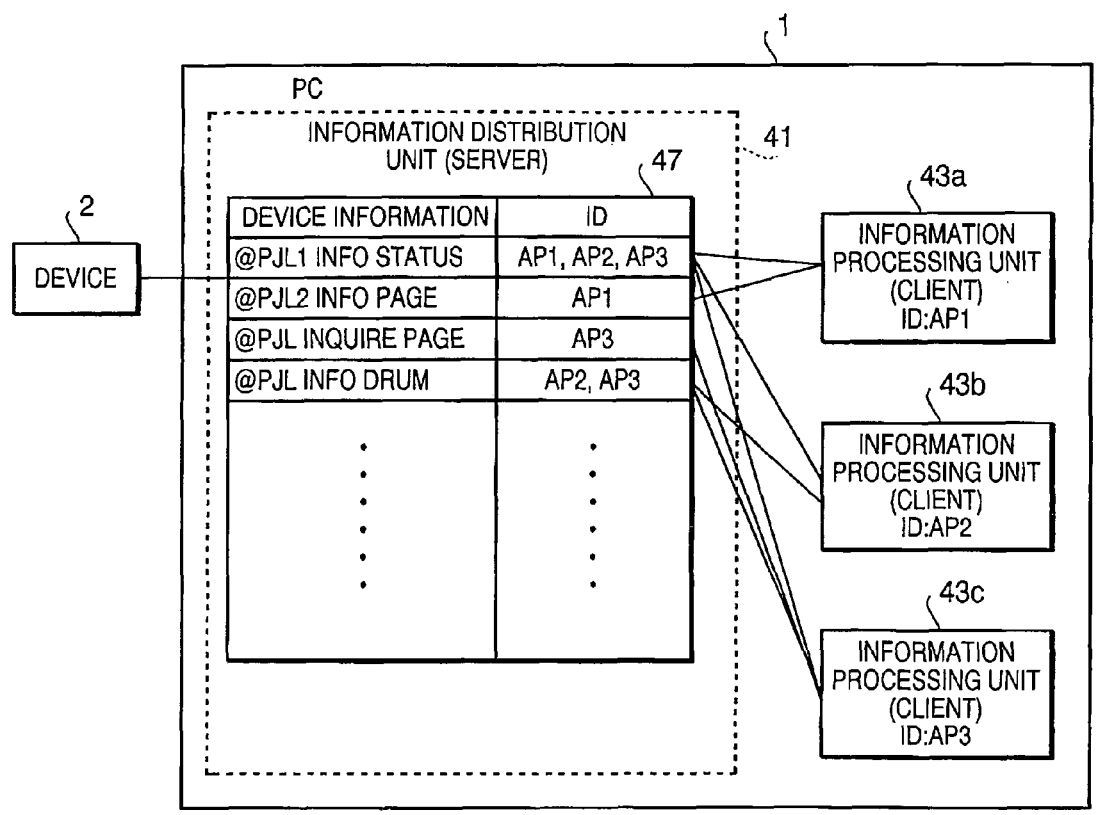
FIG. 6 is a schematic diagram showing a method for distributing device information employed in a second embodiment of the present invention.

As a result of the operation of the information distribution unit 41 of the second embodiment storing device information and IDs in the buffer 47 in regard to each command, multiple groups (pairs) of information (each including device information and ID information) are stored in the buffer 47 as shown in FIG. 6, for example.

Thereafter, when the device information read request is received from a client, the information distribution unit 41 searches the buffer 47 using the ID corresponding to the requesting client as a search key. For example, when the read request is received from the information processing unit 43a, the information distribution unit 41 searches the buffer 47 using the ID "AP1" as the search key. In this case, two storage area groups corresponding to the PJL commands "@PJL1 INFO STATUS" and "@PJL2 INFO PAGE" are found by the search in the example of FIG. 6. The information distribution unit 41 reads out device information from the two storage area groups found by the search and supplies the device information (read from the two storage area groups) to the information processing unit 43a.

Figure 7:
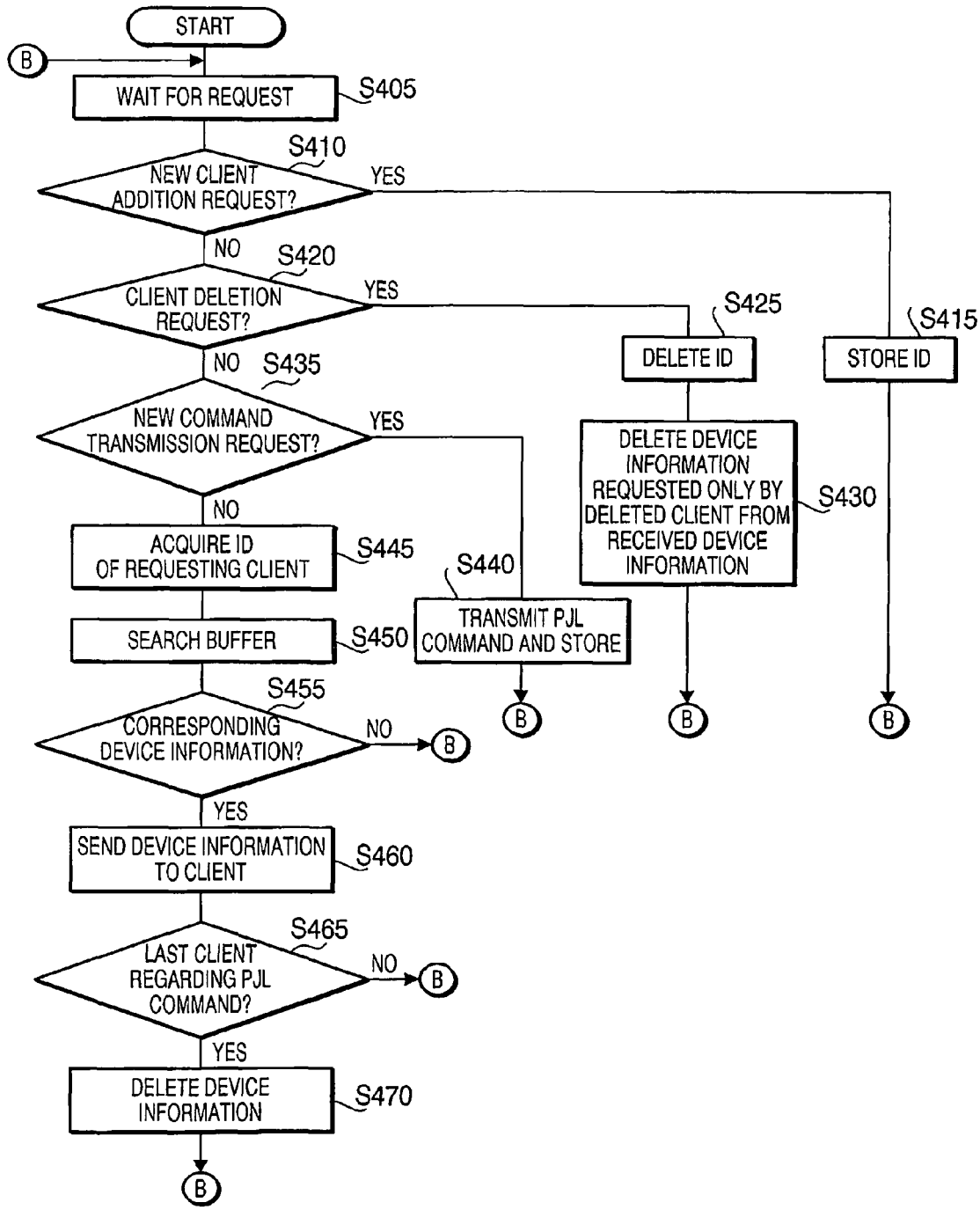
FIG. 7 is a flow chart showing a main process executed by an information distribution unit of the PC in the second embodiment.

Next, a main process executed by the information distribution unit 41 of the second embodiment for implementing its own functions described above will be explained in detail referring to a flow chart of FIG. 7. The main process of FIG. 7, which has to be started before the functions of the information distribution unit 41 becomes necessary, may be started at the startup of the PC 1, for example.

At the start of the main process, the information distribution unit 41 waits for a request from an information processing unit 43 as a client (S405). When a request from an information processing unit 43 is received, the information distribution unit 41 judges whether the received request is a new client addition request or not (S410).

If the received request is a new client addition request (S410: YES), the information distribution unit 41 stores the ID of the requesting client in the RAM 13 (S415). As shown in FIG. 6, each information processing unit 43a-43c as a client has been assigned a unique ID (AP1-AP3 in the example of FIG. 6), and the ID of the requesting client is stored in the RAM 13 similarly to the first embodiment. After finishing the step S415, the information distribution unit 41 returns to the step S405 to repeat the process from S405.

On the other hand, if the received request is not a new client addition request (S410: NO), the information distribution unit 41 judges whether the received request is a client deletion request or not (S420).

If the received request is a client deletion request (S420: YES), the information distribution unit 41 deletes the ID corresponding to the requesting client (deleted client) from the RAM 13 (S425) and deletes device information that was requested only by the deleted client from all device information that has been received (i.e. all device information that has been stored in the buffer 47) (S430). After finishing the step S430, the information distribution unit 41 returns to the step S405 to repeat the process from S405.

On the other hand, if the received request is not a client deletion request (S420: NO), the information distribution unit 41 judges whether the received request is a new command transmission request or not (S435). Also in the second embodiment, a command transmission request containing a PJL command and the ID of the requesting client is sent from each client (information processing unit 43a-43c) similarly to the first embodiment.

If the received request is a new command transmission request (S435: YES), the information distribution unit 41 transmits a PJL command (requested by the new command transmission request to be transmitted) to the device 2 via the spooler and the USB I/F 17 and stores the PJL command in the RAM 13 while associating the PJL command with the ID of the client (S440). The PJL command stored in the RAM 13 in the step S440 will be referred to in a judgment step S510 which will be explained later. After finishing the step S440, the information distribution unit 41 returns to the step S405 to repeat the process from S405.

On the other hand, if the received request is not a new command transmission request (S435: NO), the information distribution unit 41 judges that the received request is a device information read request from a client similarly to the first embodiment. In this case, the information distribution unit 41 acquires the ID corresponding to the requesting client (S445) and searches the buffer 47 using the ID as a search key (S450). If no storage area group storing the ID (search key) is found in the buffer 47, it means that the buffer 47 contains no device information corresponding to the device information read request, that is, no device information received from the device 2 in response to a PJL command transmitted to the device 2 according to a request by the client. In this case (S455: NO), the information distribution unit 41 returns to the step S405 to repeat the process from S405.

On the other hand, if one or more storage area groups storing the ID (search key) are found in the buffer 47, it means that the buffer 47 contains device information corresponding to the device information read request. In this case (S455: YES), the information distribution unit 41 sends the device information stored in the one or more storage area groups (storing the ID) to the requesting client while deleting the ID which has been associated with the device information in the step S440 (S460). Incidentally, the device information sent to the requesting client in the step S460 is device information that has been read out from the device 2 and stored in the buffer 47 by a resident thread process (explained in detail later) which is executed in parallel with the main process of FIG. 7.

After finishing the step S460, the information distribution unit 41 judges whether or not the requesting client is the last client regarding each request command (PJL command) corresponding to each storage area group found in the search of S450 (that is, whether or not the storage area group contains no ID after the deletion of the ID in S460) (S465). If the requesting client is the last client (S465: YES), the information distribution unit 41 deletes the device information stored in the storage area group (corresponding to the PJL command) from the buffer 47 (S470) and thereafter returns to the step S405 to repeat the process from S405. If the requesting client is not the last client regarding each PJL command corresponding to each storage area group found in the search of S450 (S465: NO), the information distribution unit 41 returns to the step S405 without executing the step S470.

Incidentally, the steps S465 and S470 are employed in this embodiment to deal with cases where command transmission requests requesting the transmission of the same PJL command have been issued by two or more clients. Thanks to the steps S465 and S470, even when device information (corresponding to a PJL command) is acquired by a client, the device information is not deleted from the buffer 47 if there remains another client yet to acquire the device information. When all clients requesting the device information have acquired the device information, the device information (corresponding to the PJL command) is deleted from the buffer 47.

Figure 8:
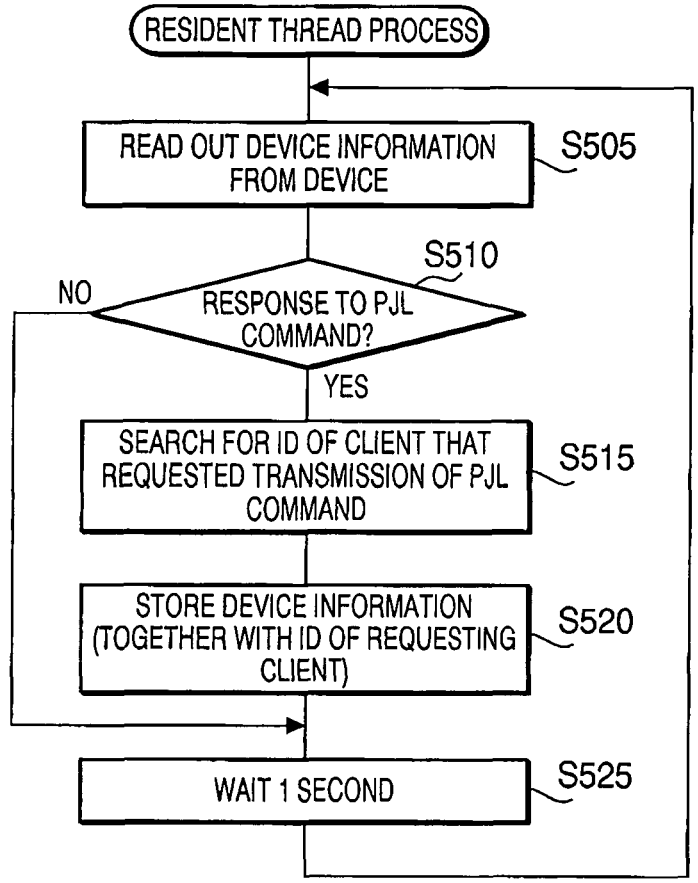
FIG. 8 is a flow chart showing a resident thread process executed by the information distribution unit in the second embodiment.

Next, the resident thread process executed by the information distribution unit 41 in parallel with the main process of FIG. 7 will be explained in detail referring to a flow chart of FIG. 8.

At the start of the resident thread process, the information distribution unit 41 reads out device information from the device 2 (S505). Incidentally, when the device 2 is not in the state for transmitting device information (e.g. when no PJL command has been transmitted to the device 2), the information distribution unit 41 waits in the step S505 until device information can be read out. When certain information is read out from the device 2, the step S505 is finished.

Subsequently, the information distribution unit 41 judges whether or not the information read out from the device 2 in S505 is a response to a PJL command transmitted to the device 2 according to a request of a client (S510). Each PJL command transmitted to the device 2 according to a client's request has been stored in the RAM 13 in the aforementioned step S440, and thus the information distribution unit 41 in the step S510 can judge whether the information read out from the device 2 in S505 is expected device information or not by comparing the information with each PJL command stored in the RAM 13 in S440.

If the information is a response to a PJL command transmitted to the device 2 according to a client's request (S510: YES), the information distribution unit 41 searches for the ID of the client that requested the transmission of the PJL command (S515) and stores the device information read out from the device 2 in S505 and the ID found in the search of S515 as a pair of information, in a storage area group (corresponding to the PJL command corresponding to the device information) in the buffer 47 (S520). Incidentally, when the device information has already been stored in a storage area group corresponding to the PJL command together with an ID of a different client, the information distribution unit 41 in the step S520 only adds the ID found in the search of S515 to the memory contents of the storage area group corresponding to the PJL command. On the other hand, if the information read out from the device 2 in S505 is not a response to a PJL command transmitted to the device 2 according to a client's request (S510: NO), the information distribution unit 41 skips the steps S515 and S520.

After finishing the steps S510-S520, the information distribution unit 41 waits 1 second (S525) and thereafter returns to the step S505 to repeat the process from S505.

In the above resident thread process executed by the information distribution unit 41 in the second embodiment, the process from the step S510 is executed each time device information is read out from the device 2 in S505, by which device information corresponding to each PJL command is stored in each storage area group (reserved corresponding to each PJL command).

As described above, in the second embodiment, device information on the device 2 that can be received from the device 2 only once is acquired by the information distribution unit 41 similarly to the first embodiment. The information distribution unit 41 in the second embodiment stores the acquired device information in the buffer 47 in regard to each of different PJL commands and thereafter supplies the stored device information to information processing units that requested the device information, by which the information processing units are allowed to execute information processing properly by use of the device information.

Further, similarly to the first embodiment, even when information other than device information corresponding to (requested by) a PJL command transmitted by the information distribution unit 41 to the device 2 is erroneously acquired from the device 2 for some reason, the information distribution unit 41 does not supply such information to the information processing units 43a-43c (S510), by which the PC 1 is relieved of a processing load for supplying such useless information to the information processing units 43a-43c (i.e. processing load for executing the steps S515 and S520) and the information processing units 43a-43c are also relieved of a processing load for processing the useless information.

The device information acquired from the device 2 is temporarily stored in the buffer 47 in the second embodiment. Therefore, the timing of acquisition of the device information from the device 2 and the timing of supplying the device information to each information processing unit 43a-43c can be made asynchronous with each other, by which it becomes possible to supply the device information to each information processing unit 43a - 43c exactly when the device information has become necessary to the information processing unit 43a- 43c.

In the second embodiment, the storing of device information in the buffer 47 is executed in regard to each of different PJL commands. Therefore, the need of storing the same device information (corresponding to the same PJL command) in a plurality of buffers (when the transmission of the same PJL command is requested by a plurality of information processing units) is eliminated, by which memory consumption of the RAM 13 can be reduced.

Third Embodiment

In the following, a third embodiment in accordance with the present invention will be described, wherein the difference from the first and second embodiments will be mainly explained in detail since part of the configuration of the third embodiment is in common with the previous embodiments. Specifically, the composition of the PC 1 and the device 2 and the process executed by each information processing unit 43a-43c are in common with the previous embodiments and thus repeated explanation thereof is omitted for brevity. Reference characters identical with those in the previous embodiments represent elements identical or equivalent to those of the previous embodiments.

First, the outline of device information acquisition executed by the PC 1 in the third embodiment will be explained referring to FIG. 9. In the third embodiment, the information distribution unit 41 and the information processing units 43a-43c operate and function on the PC 1 similarly to the first and second embodiments. However, the information distribution unit 41 in the third embodiment executes a process specifically designed for a type of PJL command "USTATUS", differently from the previous embodiments.

For many of PJL commands transmitted from the information distribution unit 41, the device 2 returns device information (as the response to the PJL command) only once. However, when a PJL command "USTATUS" specifying "ON" is received, the device 2 thereafter returns device information over and over each time the device 2 detects change of status of itself even if the same PJL command is not repeatedly transmitted by the information distribution unit 41.

Therefore, when a command transmission request (requesting the transmission of a PJL command to the device 2) is received from a client (information processing unit), the information distribution unit 41 in the third embodiment prepares (reserves) a buffer corresponding to the particular PJL command. Thereafter, each time device information as a response to the particular PJL command is returned from the device 2, the information distribution unit 41 stores the returned device information in the buffer corresponding to the PJL command.

Figure 9:
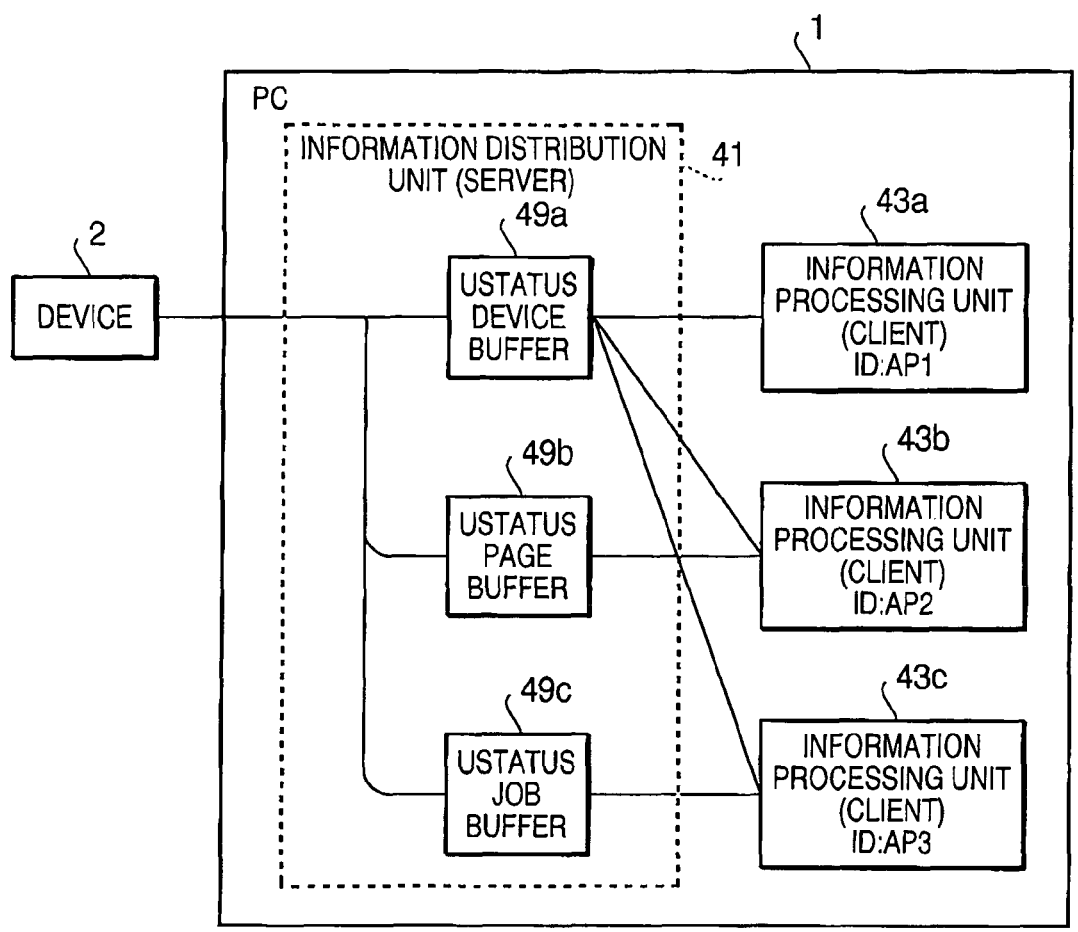
FIG. 9 is a schematic diagram showing a method for distributing device information employed in a third embodiment of the present invention.

In the example of FIG. 9, when the information distribution unit 41 is requested by the information processing unit 43a to transmit a PJL command "EPJL USTATUS DEVICE=ON", the information distribution unit 41 reserves a buffer 49a corresponding to "USTATUS DEVICE". While the information distribution unit 41 may thereafter be requested by a different information processing unit 43b or 43c to transmit the same PJL command "@PJL USTATUS DEVICE =ON", the information distribution unit 41 does not reserve a new buffer since the buffer 49a corresponding to "USTATUS DEVICE" has already been reserved. In this case, the existing buffer 49a becomes available to the information processing units 43b and 43c. When the information distribution unit 41 is further requested by the information processing unit 43b to transmit a PJL command "@PJL USTATUS PAGE=ON", the information distribution unit 41 reserves a buffer 49b corresponding to "USTATUS PAGE". When the information distribution unit 41 is further requested by the information processing unit 43c to transmit a PJL command "@PJL USTATUS JOB=ON", the information distribution unit 41 reserves a buffer 49c corresponding to "USTATUS JOB". Thereafter, device information is returned from the device 2 each time the device 2 detects change of its status as mentioned above. Upon reception of device information from the device 2, the information distribution unit 41 judges which PJL command corresponds to the received device information and stores the received device information in a buffer (one of the buffers 49a-49c) corresponding to the PJL command.

Figure 10:
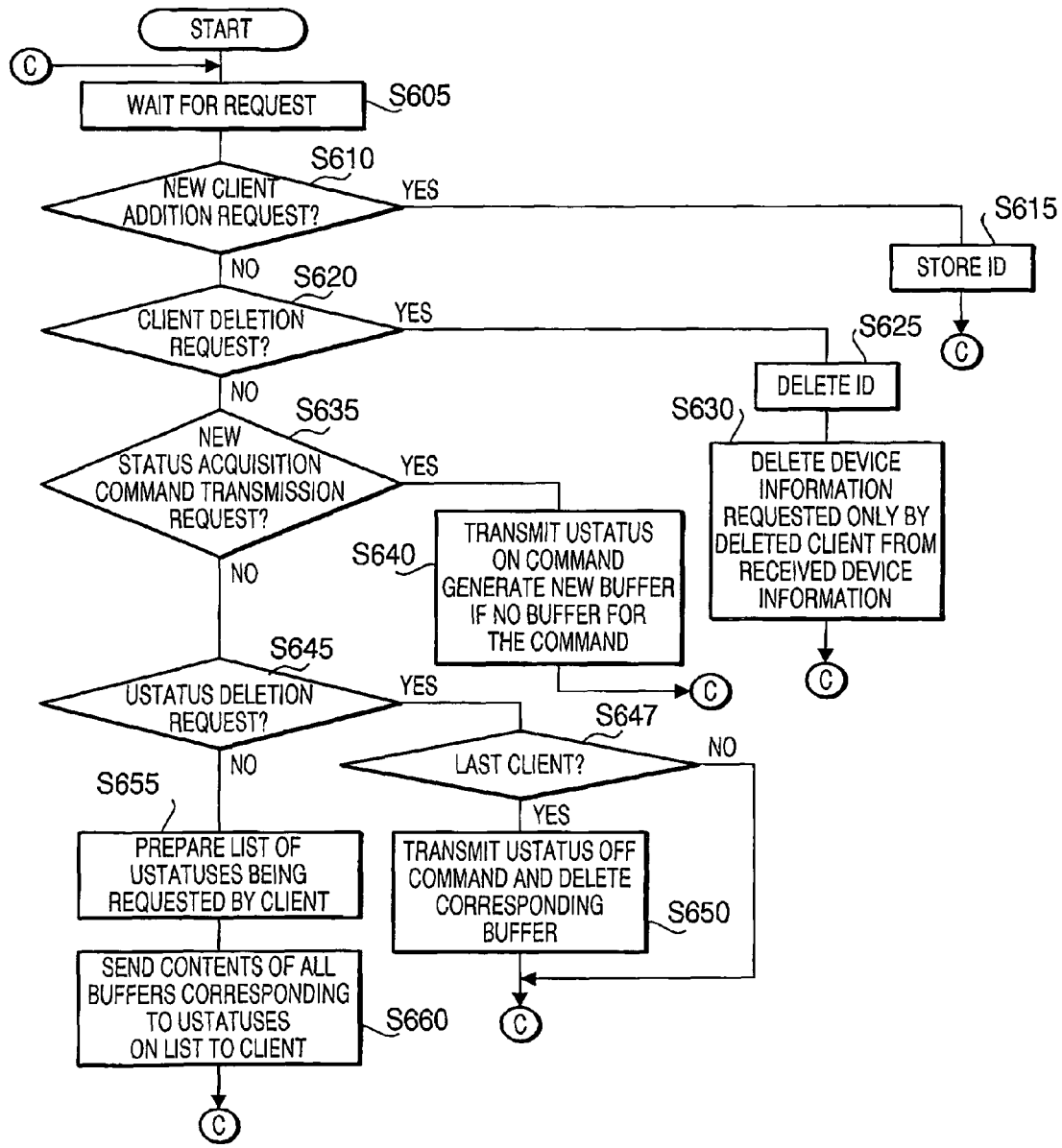
FIG. 10 is a flow chart showing a main process executed by an information distribution unit of the PC in the third embodiment.

Next, a main process executed by the information distribution unit 41 of the third embodiment for implementing its own functions described above will be explained in detail referring to a flow chart of FIG. 10. The main process of FIG. 10, which has to be started before the functions of the information distribution unit 41 becomes necessary, may be started at the startup of the PC 1, for example.

At the start of the main process, the information distribution unit 41 waits for a request from an information processing unit 43 as a client (S605). When a request from an information processing unit 43 is received, the information distribution unit 41 judges whether the received request is a new client addition request or not (S610).

If the received request is a new client addition request (S610: YES), the information distribution unit 41 stores the ID of the requesting client in the RAM 13 (S615). As shown in FIG. 6, each information processing unit 43a-43c as a client has been assigned a unique ID (AP1-AP3 in the example of FIG. 9), and the ID of the requesting client is stored in the RAM 13 similarly to the first embodiment. After finishing the step S615, the information distribution unit 41 returns to the step S605 to repeat the process from S605.

On the other hand, if the received request is not a new client addition request (S610: NO), the information distribution unit 41 judges whether the received request is a client deletion request or not (S620).

If the received request is a client deletion request (S620: YES), the information distribution unit 41 deletes the ID corresponding to the requesting client (deleted client) from the RAM 13 (S625) and deletes device information that was requested only by the deleted client from all device information that has been received (i.e. all device information that has been stored in the buffers 49a-49c) (S630). After finishing the step S630, the information distribution unit 41 returns to the step S605 to repeat the process from S605.

On the other hand, if the received request is not a client deletion request (S620: NO), the information distribution unit 41 judges whether the received request is a new USTATUS acquisition command transmission request or not (S635). While a command transmission request containing a PJL command is sent from each client (information processing unit 43a-43c) similarly to the first embodiment, the PJL command contained in each command transmission request is assumed to be a USTATUS acquisition command in the third embodiment.

If the received request is a new USTATUS acquisition command transmission request (S635: YES), the information distribution unit 41 transmits the USTATUS ON command (i.e. the USTATUS acquisition command requested by the new USTATUS acquisition command transmission request to be transmitted) to the device 2 via the spooler and the USB I/F 17 while generating a new buffer corresponding to the transmitted PJL command (USTATUS ON command) if the transmission of the particular PJL USTATUS command is for the first time (S640). If a buffer corresponding to the particular PJL USTATUS command has already been generated due to a request from another client, the step S640 is skipped. In the buffer generated in the step S640, device information will be stored over and over at random times by a resident thread process which will be explained later. After finishing the step S640, the information distribution unit 41 returns to the step S605 to repeat the process from S605.

On the other hand, if the received request is not a new USTATUS acquisition command transmission request (S635: NO), the information distribution unit 41 judges whether the received request is a USTATUS deletion request or not (S645). Since device information is repeatedly returned from the device 2 any number of times once a USTATUS ON command is transmitted to the device 2 as explained above, a USTATUS OFF command corresponding to the USTATUS ON command has to be transmitted to the device 2 in order to stop the repeated responses to the USTATUS ON command (device information) from the device 2. The step S645 is a step related to the transmission of the USTATUS OFF command. If the received request is a USTATUS deletion request (S645: YES), the information distribution unit 41 judges whether or not the requesting client is the last client regarding a USTATUS ON command corresponding to the USTATUS deletion request (i.e. a USTATUS ON command requested by the USTATUS deletion request to be deleted) (S647). If the questing client is the last client (S647: YES), the information distribution unit 41 transmits a USTATUS OFF command (requested by the USTATUS deletion request to be transmitted) to the device 2 via the spooler and the USB I/F 17 and deletes the buffer corresponding to the USTATUS ON command (corresponding to the USTATUS OFF command) (S650). If there remains another client regarding the USTATUS ON command, that is, if there exists another client that has requested the transmission of the USTATUS ON command and has not issued the USTATUS deletion request yet (S647: NO), the step S650 is skipped. Thereafter, the information distribution unit 41 returns to the step S605 to repeat the process from S605.

On the other hand, if the received request is not a USTATUS deletion request (S645: NO), the information distribution unit 41 in this embodiment judges that the received request is a device information read request from a client. The judgment is executed by a process of elimination similarly to the previous embodiments. In this case, the information distribution unit 41 prepares a list of USTATUSes being requested by the requesting client (S655) and sends the contents of all buffers corresponding to the USTATUSes on the USTATUS list to the requesting client (S660). For example, when the requesting client is the information processing unit 43b shown in FIG. 9, a list including "USTATUS DEVICE" and "USTATUS PAGE" is prepared as the USTATUS list for the information processing unit 43b in S655, and the contents of the buffers 49a and 49b corresponding to "USTATUS DEVICE" and "USTATUS PAGE" are transmitted to the information processing unit 43b in S660. After finishing the step S660, the information distribution unit 41 returns to the step S605 to repeat the process from S605.

Figure 11:
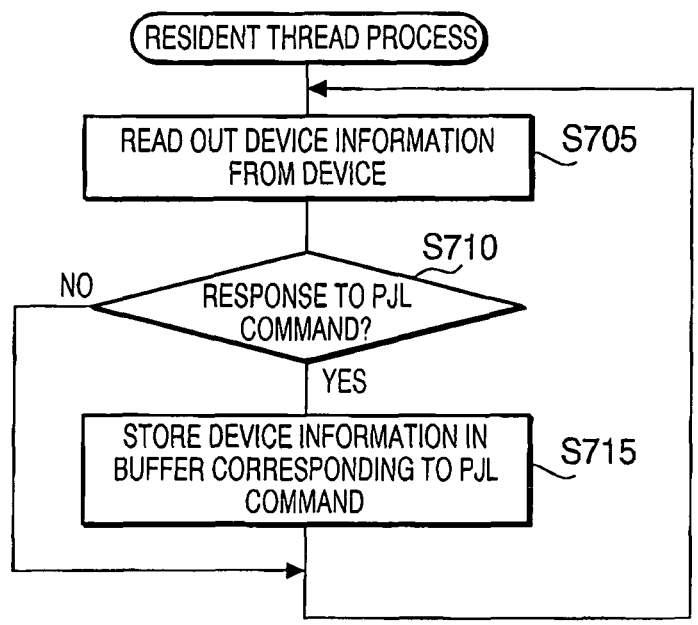
FIG. 11 is flow chart showing a resident thread process executed by the information distribution unit in the third embodiment.

Next, the resident thread process executed by the information distribution unit 41 in parallel with the main process of FIG. 10 will be explained in detail referring to a flow chart of FIG. 11.

At the start of the resident thread process, the information distribution unit 41 reads out device information from the device 2 (S705). Incidentally, when the device 2 is not in the state for transmitting device information (e.g. when no PJL command has been transmitted to the device 2), the information distribution unit 41 waits in the step S705 until device information can be read out. When certain information is read out from the device 2, the step S705 is finished.

Subsequently, the information distribution unit 41 judges whether or not the information read out from the device 2 in S705 is a response to a PJL command transmitted to the device 2 according to a request of a client (S710). When a PJL command has been transmitted to the device 2 according to a client's request, there exists a buffer already reserved (in S640 of FIG. 10) corresponding to the PJL command, and thus the information distribution unit 41 in the step S710 can judge whether the information read out from the device 2 in S705 is expected device information or not by comparing the information with each PJL command corresponding to each buffer reserved in S640.

If the information is a response to a PJL command transmitted to the device 2 according to a client's request (S710: YES), the information distribution unit 41 stores the information (device information) in the buffer corresponding to the PJL command (S715). If the information is not a response to a PJL command transmitted to the device 2 according to a client's request (S710: NO), the information distribution unit 41 skips the step S715.

After finishing the steps S710-S715, the information distribution unit 41 returns to the step S705 to repeat the process from S705.

In the above resident thread process executed by the information distribution unit 41 in the third embodiment, the process from the step S710 is executed each time device information is read out from the device 2 in S705, by which device information corresponding to each USTATUS ("USTATUS DEVICE", "USTATUS PAGE", "USTATUS JOB") is stored in each buffer (49a-49c) corresponding to the USTATUS.

As described above, in the third embodiment, device information on the device 2 that can be received from the device 2 only once is acquired by the information distribution unit 41 similarly to the first and second embodiments. The information distribution unit 41 in the third embodiment stores acquired device information corresponding to each USTATUS ("USTATUS DEVICE", "USTATUS PAGE", "USTATUS JOB") in each buffer (49a-49c) corresponding to each USTATUS and thereafter supplies the stored device information to information processing units that requested the device information, by which the information processing units are allowed to execute information processing properly by use of the device information.

Further, similarly to the previous embodiments, even when information other than device information corresponding to (requested by) a PJL command transmitted by the information distribution unit 41 to the device 2 is erroneously acquired from the device 2 for some reason, the information distribution unit 41 does not supply such information to the information processing units 43a-43c (S710), by which the PC 1 is relieved of a processing load for supplying such useless information to the information processing units 43a-43c (i.e. processing load for executing the steps S715) and the information processing units 43a-43c are also relieved of a processing load for processing the useless information.

The device information acquired from the device 2 is temporarily stored in the buffers 49a-49c in the third embodiment. Therefore, the timing of acquisition of the device information from the device 2 and the timing of supplying the device information to each information processing unit 43a-43c can be made asynchronous with each other, by which it becomes possible to supply the device information to each information processing unit 43a-43c exactly when the device information has become necessary to the information processing unit 43a-43c.

In the third embodiment, device information corresponding to each USTATUS ("USTATUS DEVICE", "USTATUS PAGE", "USTATUS JOB") is stored in each buffer (49a-49c) corresponding to each USTATUS. Therefore, the need of storing the same device information (corresponding to the same USTATUS) in a plurality of buffers (when the transmission of the same USTATUS acquisition command (the same USTATUS ON command) is requested by a plurality of information processing units) is eliminated, by which memory consumption of the RAM 13 can be reduced.

Fourth Embodiment

In the following, a fourth embodiment in accordance with the present invention will be described in detail. While how the PC 1 is placed and used in the information distribution processing system has not been particularly described in the previous embodiments and the PC 1 can typically be used as an independent PC, the PC 1 in each of the previous embodiments can achieve remarkable effects when it is used as a terminal server. Therefore, an embodiment in which the PC 1 is used as a terminal server will be described below.

Figure 12A:
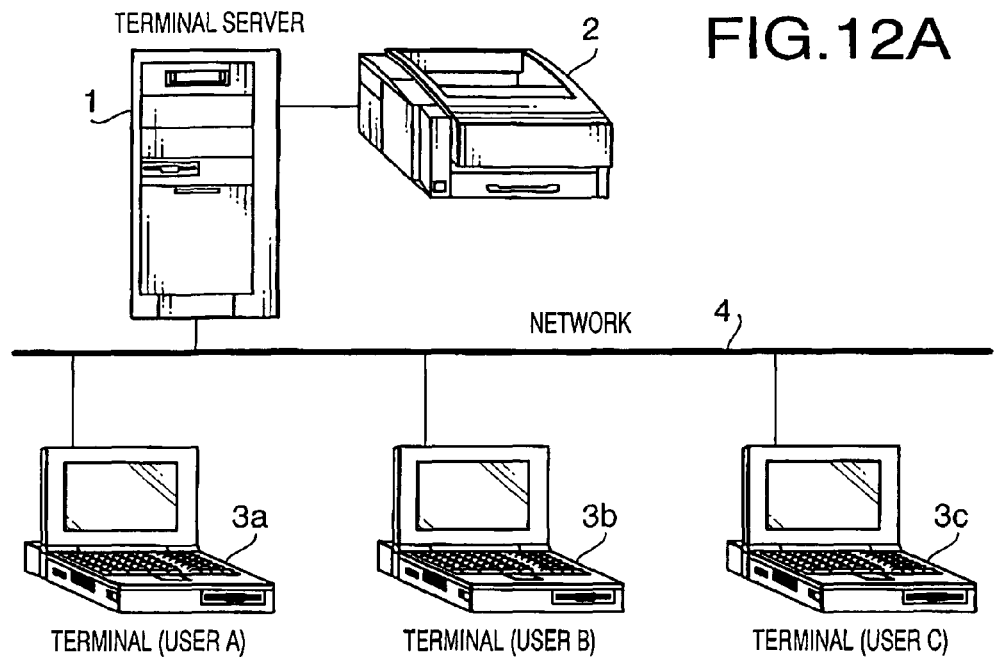
FIG. 12A is a schematic diagram showing an information distribution processing system in accordance with a fourth embodiment of the present invention, in which the PC in one of the first through third embodiments is used as a terminal server.

FIG. 12A is a schematic diagram showing an information distribution processing system in accordance with the fourth embodiment of the present invention, in which the PC 1 described in one of the first through third embodiments is used as a terminal server.

To the PC 1, the device 2 is connected via the USB interfaces similarly to the first through third embodiments. While not mentioned in the previous embodiments, the PC 1 is configured to be capable of data communication with a plurality of terminals 3a-3c via a network 4.

Since the terminals 3a-3c in such a terminal server system function only for providing the user with I/O (input-output) interfaces, low-priced PCs with no HDD can be employed as the terminals 3a-3c. On the other hand, the PC 1 is equipped with an OS having the multi-user function. Various applications can function in parallel on the PC 1 according to requests from the terminals 3a-3c (clients). When an input operation is performed on a terminal 3a-3c, input data (e.g. key entry data) is transmitted to the PC 1 via the network 4 and various processes according to the input data are executed on the PC 1. Output data as the result of the processes (e.g. screen display data) is transmitted from the PC 1 to the terminal 3a-3c via the network 4 and outputted (e.g. displayed on a screen) by the terminal 3a-3c.

In the terminal server system configured as above, each user of each terminal 3a-3c can hope to know the status of the device 2. In such cases, the status monitor might be used on each of the terminals 3a-3c. In the terminal server system, the status monitor operates only on the PC 1 even when the status monitor is used on each of the terminals 3a-3c. Therefore, the device 2 might be requested by a plurality of status monitors to supply its device information.

However, the device 2 (configured to simply return the latest device information to the PC 1 in response to a request from the PC 1) can not supply device information individually to each of the status monitors.

Thus, when a plurality of status monitors are operating on a conventional terminal server that is not configured as in the present invention, once a status monitor trying first to acquire device information from the device 2 successfully acquires the device information, other status monitors trying to acquire the same device information later can not acquire the expected device information.

Figure 12B:
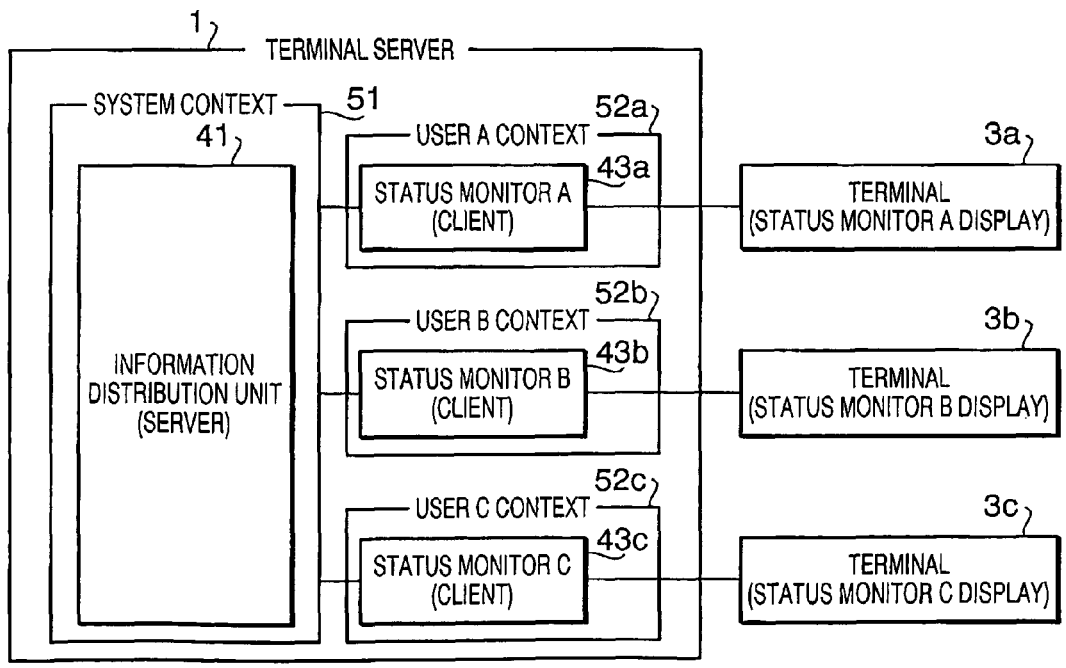
FIG. 12B is a block diagram showing the operation of the terminal server (PC) and terminals in the information distribution processing system of FIG. 12A.

On the other hand, by use of the PC 1 (configured as in one of the previous embodiments) as the terminal server, a configuration like the one shown in FIG. 12B becomes possible, in which the aforementioned information distribution unit 41 functions on a system context 51 while status monitors (equivalent to the aforementioned information processing units 43a-43c) function on user contexts 52a-52c corresponding to the terminals 3a-3c. With such a configuration and the operations and effects described in the above embodiments, device information supplied from the device 2 in response to a command transmitted to the device 2 according to a request from each status monitor (information processing unit 43a-43c) is supplied to each status monitor (information processing unit 43a-43c) by the information distribution unit 41, by which not only a status monitor first trying to acquire device information but also other status monitors trying to acquire the device information later can successfully acquire the expected device information.

When the transmission of the same command (for acquiring particular device information) is requested by two or more status monitors (information processing units 43a-43c), the device information supplied to the first status monitor (first trying to acquire the device information) has already been stored in a buffer, and thus the device information can be immediately supplied to following status monitors (trying to acquire the device information later).

Further, when the PC 1 in the terminal server system of this embodiment is configured as in the second or third embodiment, memory consumption of the RAM 13 can be minimized even when the transmission of the same command is requested by a plurality of status monitors (information processing units 43a-43c) since the information distribution unit 41 reserves a storage area group or buffer for each of different commands (PJL commands).

While a description has been given above of preferred embodiments in accordance with the present invention, the present invention is not to be restricted by the particular illustrative embodiments and a variety of modifications, design changes, etc. are possible without departing from the scope and spirit of the present invention described in the appended claims.

For example, while the information distribution unit 41 in each of the above embodiments judges whether information acquired from the device 2 is a response to a command transmitted to the device 2 or not by executing the step S215, S510 or S710, the information distribution unit 41 may also be configured to supply all the acquired information directly to each information processing unit without making the judgment. In this case, each information processing unit is configured to make a proper selection of expected device information from the supplied information since unnecessary information can be supplied from the information distribution unit 41.

While the method of data communication between the information distribution unit 41 and each information processing unit 43a-43c in the PC 1 has not been described particularly in the above embodiments, the interprocess communication can be executed by means of any proper method. For example, data can be communicated between the information distribution unit 41 and each information processing unit 43a-43c by use of a shared memory, etc.

Figure 4:
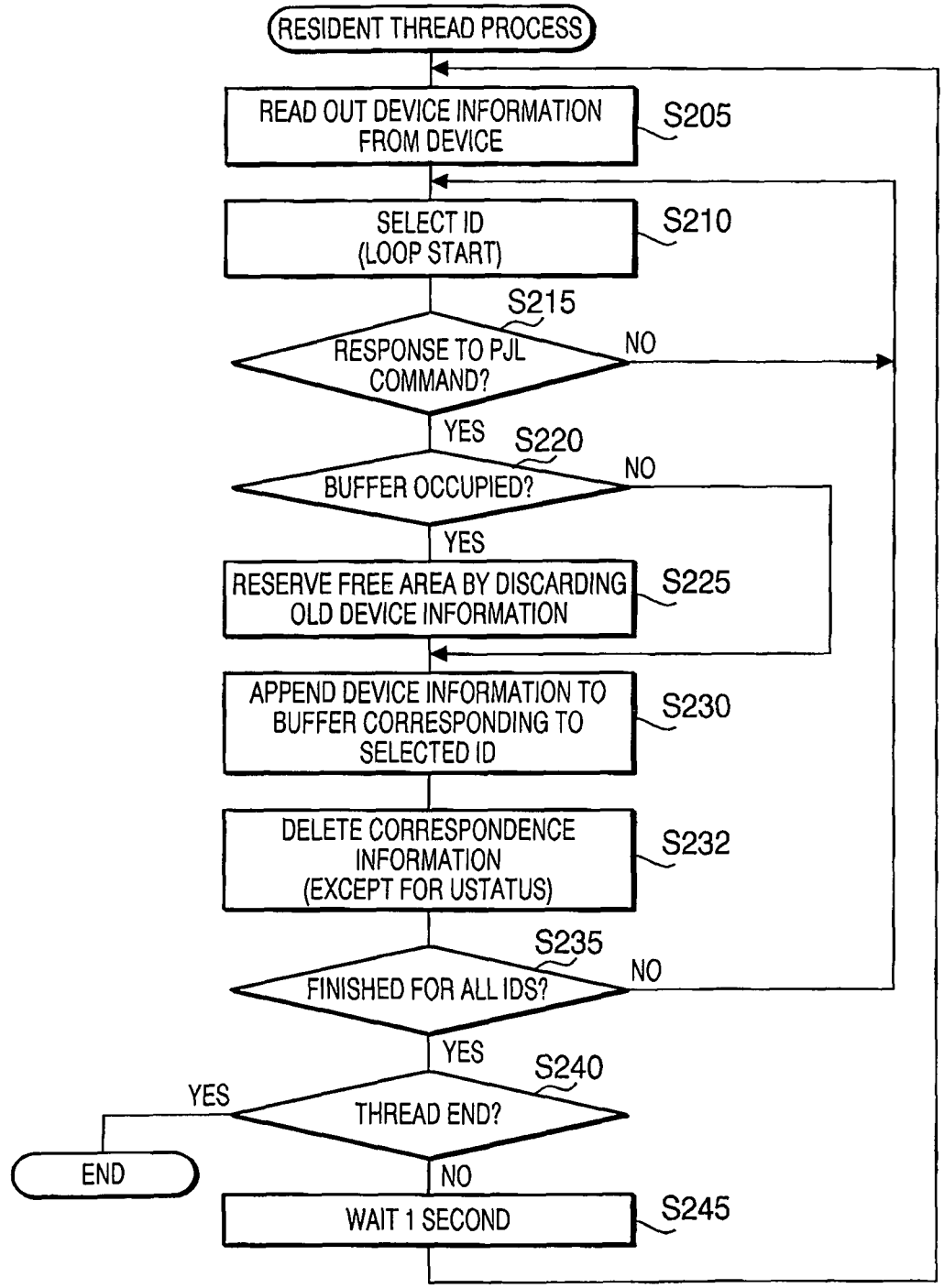
FIG. 4 is a flow chart showing a resident thread process executed by the information distribution unit in the first embodiment.

While the information distribution unit 41 in the first embodiment reserves a sufficient free area in the buffer by discarding (deleting) old device information in S225 of FIG. 4, the information distribution unit 41 may also be configured to discard the acquired latest device information while leaving the old device information in the buffer. Either configuration may be employed in consideration of which of old device information and new device information is more important.

While a "PC" connected to the device 2, a "PC" having the function of the information distribution unit 41 and a "PC" having the functions of a plurality of information processing units (e.g. 43a-43c) are integrated into a single PC 1 in the above embodiments, such "PCs" may also be placed separately in two or more PCs and configured to cooperate with one another to function similarly to the single PC 1. In this case, the two or more PCs are configured to be capable of data communication via a network. Assuming that output data of a unit placed in a PC is processed by a unit placed in another PC as input data, the network system is configured so that the output data obtained by the first PC is transmitted to the second PC via the network and the whole network system including the two or more PCs functions similarly to the single PC 1.

More specifically, a network system can be formed by connecting the device 2 to the PC 1 while providing the PC 1 with a plurality of information processing units, providing a server separately from the PC 1 (hereinafter referred to as an "information distribution server") instead of the information distribution unit 41 (placed in the PC 1 in the above embodiments), configuring the PC 1 to transfer various data communicated between each information processing unit and the device 2 to the information distribution server, and configuring the information distribution server to execute various processes (executed by the information distribution unit 41 in the above embodiments) according to the data transferred from the PC 1 and return the result of the processes to the PC 1.

What is claimed is:

1. A non-transitory computer readable medium comprising computer-readable instructions, wherein the instructions executed by a computer processor cause the computer to function as:
  a plurality of information processing units, wherein instructions executed by the computer processor enable each of the plurality of information processing units to issue a command transmission request for device information of a predetermined device and to execute information processing based on the device information;
  a command transmission request receiving unit, wherein instructions executed by the computer processor cause the command transmission request receiving unit to receive the command transmission request issued by a first information processing unit of the plurality of information processing units, the first information processing unit issuing the command transmission request earliest among the plurality of information processing units;
  a command transmitting unit, wherein instructions executed by the computer processor cause the command transmitting unit to transmit a device information request command to the predetermined device via an interface in response to the command transmission request issued by the first information processing unit and received by the command transmission request receiving unit;
  a device information acquiring and supplying unit, wherein instructions executed by the computer processor cause the device information acquiring and supplying unit to: acquire device information supplied from the predetermined device as a response to the device information request command and store the device information acquired by the device information acquiring and supplying unit in a storage unit of the computer;

supply the device information stored in the storage unit to the first information processing unit;

in response to the command transmission request receiving unit receiving a command transmission request for device information from at least one second information processing unit of the plurality of information processing units, wherein the at least one second information processing unit is different from the first information processing unit, determine whether the command transmission request issued by the at least one second information processing unit is different from the command transmission request issued by the first information processing unit; and when determining that the command transmission request receiving unit has received a same command transmission request from the at least one second information processing unit as the command transmission request received from the first information processing unit, supply the device information stored in the storage unit to the at least one second information processing unit without transmitting the device information request to the predetermined device and without again acquiring the device information by the device information acquiring and supplying unit, and wherein instructions executed by the computer processor cause the device information acquiring and supplying unit to supply the device information acquired by the device information acquiring and supplying unit to the information processing units asynchronously with timing of the acquisition of the device information by temporarily storing the device information acquired by the device information acquiring and supplying unit in a storage area reserved in the storage unit of the computer.

2. The non-transitory computer readable medium according to claim 1, wherein the computer-readable instructions include instructions executed by the computer processor that cause the computer to function as:

a command information storage control unit, wherein instructions executed by the computer processor cause the command information storage control unit to store command information, representing the command corresponding to the command transmission request received by the command transmission request receiving unit, in the storage unit of the computer; and a judgment unit, wherein instructions executed by the computer processor cause the judgment unit to judge whether or not the device information acquired by the device information acquiring and supplying unit corresponds to the command represented by the command information stored in the storage unit, and wherein instructions executed by the computer processor cause the device information acquiring and supplying unit to supply the device information acquired by the device information acquiring and supplying unit to the information processing units only when the device information is judged by the judgment unit to correspond to the command represented by the command information stored in the storage unit.

3. The non-transitory computer readable medium according to claim 2, wherein the computer-readable instructions include instructions executed by the computer processor that cause the computer to function as:

a sender information storage control unit, wherein instructions executed by the computer processor cause the sender information storage control unit to store sender information, representing the information processing unit as the sender of the command transmission request received by the command transmission request receiving unit, in the storage unit of the computer; and a selection unit, wherein instructions executed by the computer processor cause the selection unit to select one or more of the information processing units to which the device information judged by the judgment unit to correspond to the command represented by the command information should be supplied, based on the sender information stored in the storage unit, and wherein instructions executed by the computer processor cause the device information acquiring and supplying unit to supply the device information judged by the judgment unit to correspond to the command represented by the command information to the one or more information processing units selected by the selection unit.

4. The non-transitory computer readable medium according to claim 1, wherein instructions executed by the computer processor cause the device information acquiring and supplying unit to store the device information acquired by the device information acquiring and supplying unit in one or more storage areas reserved respectively for one or more information processing units as senders of the command transmission request received by the command transmission request receiving unit.

5. The non-transitory computer readable medium according to claim 1, wherein instructions executed by the computer processor cause the device information acquiring and supplying unit to store the device information acquired by the device information acquiring and supplying unit in a corresponding one of multiple storage areas which are reserved respectively for different commands.

6. A computer comprising:

a processor executing computer-readable instructions that cause the computer to function as:

a plurality of information processing units, wherein instructions executed by the processor enable each of the plurality of information processing units to issue a command transmission request for device information of a predetermined device and to execute information processing based on the device information;

a command transmission request receiving unit, wherein instructions executed by the processor cause the command transmission request receiving unit to receive the command transmission request issued by a first information processing unit of the plurality of information processing units, the first information processing unit issuing the command transmission request earliest among the plurality of information processing units;

a command transmitting unit, wherein instructions executed by the processor cause the command transmitting unit to transmit a device information request command to the predetermined device via an interface in response to the command transmission request issued by the first information processing unit and received by the command transmission request receiving unit;

a device information acquiring and supplying unit, wherein instructions executed by the processor cause the device information acquiring and supplying unit to:

acquire device information supplied from the predetermined device as a response to the device information request command and store the device information acquired by the device information acquiring and supplying unit in a storage unit of the computer;

supply the device information stored in the storage unit to the first information processing unit;

in response to the command transmission request receiving unit receiving a command transmission request for device information from at least one second information processing unit of the plurality of information processing units, wherein the at least one second information processing unit is different from the first information processing unit, determine whether the command transmission request issued by the at least one second information processing unit is different from the command transmission request issued by the first information processing unit; and when determining that the command transmission request receiving unit has received a same command transmission request from the at least one second information processing unit as the command transmission request received from the first information processing unit, supply the device information stored in the storage unit to the at least one second information processing unit without transmitting the device information request to the predetermined device and without again acquiring the device information by the device information acquiring and supplying unit, wherein instructions executed by the processor cause the device information acquiring and supplying unit to supply the device information acquired by the device information acquiring and supplying unit to the information processing units asynchronously with timing of the acquisition of the device information by temporarily storing the device information acquired by the device information acquiring and supplying unit in a storage area reserved in the storage unit of the computer.

7. The computer according to claim 6, wherein the processor further executes computer-readable instructions that cause the computer to function as:

a command information storage control unit, wherein instructions executed by the processor cause the command information storage control unit to store command information, representing the command corresponding to the command transmission request received by the command transmission request receiving unit, in the storage unit of the computer; and a judgment unit, wherein instructions executed by the processor cause the judgment unit to judge whether or not the device information acquired by the device information acquiring and supplying unit corresponds to the command represented by the command information stored in the storage unit, and wherein instructions executed by the processor cause the device information acquiring and supplying unit to supply the device information acquired by the device information acquiring and supplying unit to the information processing units only when the device information is judged by the judgment unit to correspond to the command represented by the command information stored in the storage unit.

8. The computer according to claim 7, wherein the processor further executes computer-readable instructions that cause the computer to function as:

a sender information storage control unit, wherein instructions executed by the processor cause the sender information storage control unit to store sender information, representing the information processing unit as the sender of the command transmission request received by the command transmission request receiving unit, in the storage unit of the computer; and a selection unit, wherein instructions executed by the processor cause the selection unit to select one or more of the information processing units to which the device information judged by the judgment unit to correspond to the command represented by the command information should be supplied, based on the sender information stored in the storage unit, and wherein instructions executed by the processor cause the device information acquiring and supplying unit to supply the device information judged by the judgment unit to correspond to the command represented by the command information to the one or more information processing units selected by the selection unit.

9. The computer according to claim 6, wherein instructions executed by the processor cause the device information acquiring and supplying unit to store the device information acquired by the device information acquiring and supplying unit in one or more storage areas reserved respectively for one or more information processing units as senders of the command transmission request received by the command transmission request receiving unit.

10. The computer according to claim 6, wherein instructions executed by the processor cause the device information acquiring and supplying unit to store the device information acquired by the device information acquiring and supplying unit in a corresponding one of multiple storage areas which are reserved respectively for different commands.

11. An information distribution processing method comprising:

issuing a command transmission request for device information of a predetermined device, wherein the command transmission request is issued by a first information processing unit of a plurality of information processing units;

a command transmission request receiving step of receiving the command transmission request issued by the first information processing unit of the plurality of information processing units, the first information processing unit issuing the command transmission request earliest among the plurality of information processing units, wherein each of the plurality of information processing units can execute information processing based on the device information acquired from the predetermined device, and wherein the command transmission request is received by a computer programmed by computer-readable instructions executed by a computer processor to function as a command transmission request receiving unit;

a command transmitting step performed by the computer programmed by computer-readable instructions executed by a computer processor to function as a command transmitting unit, the command transmitting step including transmitting a device information request command to the predetermined device via an interface in response to the command transmission request issued by the first information processing unit and received in the command transmission request receiving step;

a device information acquiring and supplying step performed by the computer programmed by computer-readable instructions executed by a computer processor to function as a device information acquiring and supplying unit, wherein the device information acquiring and supplying step includes:

acquiring the device information supplied from the predetermined device as a response to the device information request command, the device information acquired being stored in a storage unit of the computer;

supplying the device information stored in the storage unit to the first information processing unit;

in response to a command transmission request for device information issued from at least one second information processing unit of the plurality of information processing units, wherein the at least one second information processing unit is different from the first information processing unit, determining whether the command transmission request issued by the at least one second information processing unit is different from the command transmission request issued by the first information processing unit; and when determining that the command transmission request issued by the at least one second information processing unit is the same as the command transmission request issued by the first information processing unit, supplying the device information stored in the storage unit to the at least one second information processing unit without transmitting the device information request to the predetermined device and without again acquiring the device information through the device information acquiring step, and wherein instructions executed by a computer processor cause the device information acquiring and supplying unit to supply the device information acquired in the device information acquiring step to the information processing units asynchronously with timing of acquisition of the device information by temporarily storing the device information acquired in the device information acquiring step in a storage area reserved in the storage unit.

12. The information distribution processing method according to claim 11, further comprising:

a command information storage control step of storing command information, representing the command corresponding to the command transmission request received in the command transmission request receiving step, in the storage unit; and a judgment step performed by the computer programmed by computer-readable instructions executed by a computer processor to function as a judgment unit and including judging whether or not the device information acquired in the step of acquiring the device information corresponds to the command represented by the command information stored in the storage unit, and wherein instructions executed by a computer processor cause the device information acquiring and supplying unit to supply the device information acquired in the device information acquiring step to the information processing units only when the device information is judged by the judgment step to correspond to the command represented by the command information stored in the storage unit.

13. The information distribution processing method according to claim 12, further comprising:

a sender information storage control step performed by the computer programmed by computer-readable instructions executed by a computer processor to function as a sender information storage control unit and including storing sender information, representing the information processing unit as the sender of the command transmission request received by the command transmission request receiving step, in the storage unit; and a selection step performed by the computer programmed by computer-readable instructions executed by a computer processor to function as a selection unit and including selecting one or more of the information processing units to which the device information judged by the judgment step to correspond to the command represented by the command information should be supplied, based on the sender information stored in the storage unit, and wherein instructions executed by a computer processor cause the device information acquiring and supplying unit to supply the device information judged by the judgment step to correspond to the command represented by the command information to the one or more information processing units selected by the selection step.

14. The information distribution processing method according to claim 11, wherein the device information acquired in the device information acquiring step is stored in one or more storage areas reserved respectively for one or more information processing units as senders of the command transmission request received by the command transmission request receiving step.

15. The information distribution processing method according to claim 11, wherein the device information acquired in the device information acquiring step is stored in a corresponding one of multiple storage areas which are reserved respectively for different commands.

16. An information distribution processing system comprising:

a computer capable of communicating with a device; and an information processing device which is implemented by the computer or placed separately from the computer to be capable of data communication with the computer, wherein:

the information processing device includes a plurality of information processing units configured to execute information processing based on device information acquired from the device, and the computer includes a processor executing computer-readable instructions that cause the computer to function as:

a plurality of information processing units, wherein instructions executed by the processor enable each of the plurality of information processing units to issue a command transmission request for device information of a predetermined device and to execute information processing based on the device information;

a command transmission request receiving unit, wherein instructions executed by the processor cause the command transmission request receiving unit to receive the command transmission request issued by a first information processing unit of the plurality of information processing units, the first information processing unit issuing the command transmission request earliest among the plurality of information processing units;

a command transmitting unit, wherein instructions executed by the processor cause the command transmitting unit to transmit a device information request command to the predetermined device via an interface in response to the command transmission request which is issued by the first information processing unit and received by the command transmission request receiving unit;

a device information acquiring and supplying unit, wherein instructions executed by the processor cause the device information acquiring and supplying unit to:

acquire device information supplied from the predetermined device as a response to the device information request command and store the device information acquired by the device information acquiring and supplying unit in a storage unit of the computer;

supply the device information stored in the storage unit to the first information processing unit;

in response to the command transmission request receiving unit receiving a command transmission request for device information from at least one second information processing unit of the plurality of information processing units, wherein the at least one second information processing unit is different from the first information processing unit, determine whether the command transmission request issued by the at least one second information processing unit is different from the command transmission request issued by the first information processing unit; and when determining that the command transmission request receiving unit has received a same command transmission request from the at least one second information processing unit as the command transmission request received from the first information processing unit, supply the device information stored in the storage unit to the at least one second information processing unit without transmitting the device information request to the predetermined device and without again acquiring the device information by the device information acquiring and supplying unit, and wherein instructions executed by the processor cause the device information acquiring and supplying unit to supply the device information acquired by the device information acquiring and supplying unit to the information processing units asynchronously with timing of the acquisition of the device information by temporarily storing the device information acquired by the device information acquiring and supplying unit in a storage area reserved in the storage unit of the computer.

17. The information distribution processing system according to claim 16, further comprising the device supplying the device information to the device information acquiring and supplying unit.

* * * * *